United States Patent
Hamera et al.

(10) Patent No.: US 11,756,031 B1
(45) Date of Patent: Sep. 12, 2023

(54) MULTICURRENCY BLOCKCHAIN PLATFORM AND METHOD OF USE

(71) Applicant: Coinbase, Inc., San Francisco, CA (US)

(72) Inventors: Paul Hamera, San Francisco, CA (US); Alexander Kern, San Francisco, CA (US); Ali Fathalian, San Francisco, CA (US); Nikhil Srinivasan, San Francisco, CA (US); Omar Bohsali, San Francisco, CA (US); Jing Fan, San Francisco, CA (US); Josh Ellithorpe, San Francisco, CA (US)

(73) Assignee: Coinbase, Inc., Oakland, CA (US)

( * ) Notice: Subject to any disclaimer, the term of this patent is extended or adjusted under 35 U.S.C. 154(b) by 524 days.

(21) Appl. No.: 16/798,978

(22) Filed: Feb. 24, 2020

Related U.S. Application Data

(60) Provisional application No. 62/892,691, filed on Aug. 28, 2019, provisional application No. 62/809,458, filed on Feb. 22, 2019.

(51) Int. Cl.
| | |
|---|---|
| *G06Q 20/38* | (2012.01) |
| *G06Q 20/40* | (2012.01) |
| *H04L 9/06* | (2006.01) |
| *G06Q 20/36* | (2012.01) |
| *H04L 9/00* | (2022.01) |

(52) U.S. Cl.
CPC ....... *G06Q 20/401* (2013.01); *G06Q 20/3678* (2013.01); *G06Q 20/382* (2013.01); *H04L 9/0637* (2013.01); *G06Q 2220/00* (2013.01); *H04L 9/50* (2022.05)

(58) Field of Classification Search
CPC .................................................. G06Q 20/401
USPC ........................................................... 705/75
See application file for complete search history.

(56) References Cited

U.S. PATENT DOCUMENTS

| | | | | |
|---|---|---|---|---|
| 2004/0049445 | A1* | 3/2004 | Kishore | G06Q 40/04 705/37 |
| 2016/0344543 | A1* | 11/2016 | Alness | H04L 63/06 |
| 2017/0302460 | A1* | 10/2017 | Song | H04L 9/3263 |
| 2018/0069966 | A1* | 3/2018 | Laden | H04M 15/7652 |
| 2019/0266178 | A1* | 8/2019 | Madhavan | G06F 16/2365 |
| 2021/0273993 | A1* | 9/2021 | Shirley | H04L 67/10 |

OTHER PUBLICATIONS

Cavanagh, Alex, "The Arkane Network for Developers to Build Multi-Blockchain Apps", https://blog.goodaudience.com/the-arkane-network-for-develops-to-build-multi-blockchain-apps-e47a61a6940f, Oct. 12, 2018.

Dierckxsens, Tim, "Introducing Arkane Network", https://medium.com/arkane-network/introducing-arkane-network-feb4df30196c, Sep. 25, 2018.

* cited by examiner

*Primary Examiner* — Chinedu C Agwumezie
(74) *Attorney, Agent, or Firm* — Perkins Coie LLP

(57) ABSTRACT

Systems and methods for blockchain services with a multi-currency blockchain platform.

20 Claims, 17 Drawing Sheets

200

GENERATE AN ACCOUNT GATEWAY S210

MONITOR BLOCKCHAIN TRANSACTIONS S220

PROCESS A BLOCKCHAIN REQUEST S230

200

```
┌─────────────────────────────────────────────────┐
│         GENERATE AN ACCOUNT GATEWAY S210        │
│   ┌─────────────────────────────────────────┐   │
│   │         GENERATE KEY PAIR S211          │   │
│   └─────────────────────────────────────────┘   │
└─────────────────────────────────────────────────┘

┌─────────────────────────────────────────────────┐
│       MONITOR BLOCKCHAIN TRANSACTIONS S220      │
│   ┌─────────────────────────────────────────┐   │
│   │   IDENTIFY TRANSACTION MATCHING THE     │   │
│   │              GATEWAY S221               │   │
│   └─────────────────────────────────────────┘   │
│   ┌─────────────────────────────────────────┐   │
│   │      PROVIDE PAYMENT NOTIFICATION S222  │   │
│   └─────────────────────────────────────────┘   │
│   ┌─────────────────────────────────────────┐   │
│   │      PROCESS PAYMENT INFO REQUEST S223  │   │
│   └─────────────────────────────────────────┘   │
│   ┌─────────────────────────────────────────┐   │
│   │      PROVIDE PAYMENT STATE UPDATE S224  │   │
│   └─────────────────────────────────────────┘   │
└─────────────────────────────────────────────────┘

┌─────────────────────────────────────────────────┐
│          PROCESS A BLOCKCHAIN REQUEST S230      │
│   ┌─────────────────────────────────────────┐   │
│   │       RECEIVE REQUEST FROM A CLIENT     │   │
│   └─────────────────────────────────────────┘   │
│   ┌─────────────────────────────────────────┐   │
│   │   DETERMINE CHAIN-SPECIFIC ATTRIBUTES S231│  │
│   └─────────────────────────────────────────┘   │
│   ┌─────────────────────────────────────────┐   │
│   │         GENERATE TRANSACTION S232       │   │
│   └─────────────────────────────────────────┘   │
│   ┌─────────────────────────────────────────┐   │
│   │            SIGN TRANSACTION S233        │   │
│   └─────────────────────────────────────────┘   │
│   ┌─────────────────────────────────────────┐   │
│   │         BROADCAST TRANSACTION S234      │   │
│   └─────────────────────────────────────────┘   │
│   ┌─────────────────────────────────────────┐   │
│   │            SEND STATUS UPDATE S235      │   │
│   └─────────────────────────────────────────┘   │
│   ┌─────────────────────────────────────────┐   │
│   │    PROCESS TRANSACTION STATUS REQUEST S236│ │
│   └─────────────────────────────────────────┘   │
│   ┌─────────────────────────────────────────┐   │
│   │  MONITORING BLOCKCHAIN FOR FINALIZATION │   │
│   │         OF TRANSACTION S237             │   │
│   └─────────────────────────────────────────┘   │
└─────────────────────────────────────────────────┘
```

FIGURE 2B

| Request Namespace | Operation Namespace |
|---|---|
|  | Operation::Deposit - funds arrive on wallet system 101. |
| Request::Withdrawal<br><br>User wants to move funds off the wallet system 101 to an external address (Address object of type external). | Operation::Withdrawal<br><br>Created by the TransactionReceiver. |
| Request::Flush<br><br>Movements between an inbound hot wallet to an outbound hot wallet. Used to transfer funds from an inbound hot wallet to an outbound hot wallet. | Operation::Flush |
| Request::Sweep<br><br>Movements from outbound hot wallet to cold storage. Used by Hot Wallet Module (HWM) when hot wallet balance is too high. | Operation::Sweep |
| Request::Restore<br>Inverse of a Sweep. Movements from cold storage to outbound hot wallet. Used by HWO when hot wallet balance is too low. | Operation::Restore |
| Request::Custody | Operation::Custody |
| Request::Maintenance<br>Transactions performed on behalf of addresses for the purpose of initializing the wallets or performing maintenance operations. | Operation::Maintenance |
| Request::Flex<br>Transactions performed on behalf of an address to support arbitrary transaction payloads, such as for staking or contract calls. These are "flexible" requests, and hence can simulate any of the other request types. However, flex requests are only allowed on a whitelisted set of address types. | Operation::Flex |
|  | Operation::Unexpected<br>• Transaction operation<br>• Severity<br><br>This happens whenever something unexpected happens.<br>• Use Revere in Service objects where Unexpecteds are |

*FIGURE 3*

MULTICURRENCY BLOCKCHAIN PLATFORM AND METHOD OF USE

CROSS-REFERENCE TO RELATED APPLICATIONS

This application claims priority to U.S. Provisional Application No. 62/809,458 filed 22 Feb. 2019 and U.S. Provisional Application No. 62/892,691 filed 28 Aug. 2019, which are each incorporated herein in its entirety by this reference.

TECHNICAL FIELD

This invention relates generally to the computer networking field, and more specifically to a new and useful system and method for interacting with multiple blockchains by using a multicurrency blockchain platform.

BACKGROUND

Blockchains are linked lists of blocks, where each block contains modifications to the global state. Blockchains are decentralized, peer-to-peer systems, with no central authorities propagating changes to the network. Instead, blockchain nodes validate, detect, and relay state updates. For example, whenever someone wants to send funds into a particular blockchain network, they can use a wallet application to control and send their funds by interacting with a blockchain node. A hosted wallet application (provided by a blockchain platform) can detect whether the person actually did send funds to an address by querying a blockchain node. The hosted wallet application (provided by a blockchain platform) can also detect whether the person has received funds by querying a blockchain node. There are several types of blockchains and corresponding blockchain nodes, and a blockchain node of a particular blockchain runs a node application that implements a protocol specific to that blockchain. Wallet applications for a particular blockchain are specifically designed to interact with a blockchain node for the blockchain, in accordance with the blockchain protocol implemented by the blockchain node. Accordingly, there are several implementations of blockchain nodes and several implementations of wallet applications.

Thus, there is a need in the computer networking field to create a new and useful system and method for interacting with multiple blockchains. This disclosure provides such a new and useful system and method.

BRIEF DESCRIPTION OF THE FIGURES

FIGS. 2A-B are flowchart representations of methods, in accordance with embodiments.

FIG. 3 is a table showing requests and operations, in accordance with embodiments.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

The system (e.g., 100) includes at least one of: a blockchain service and a blockchain interface. In some variations, the blockchain service includes an operations module, whereas in other variations, the operations module is separate from the blockchain service. In some variations, new sub-modules can be added to the blockchain interface or the operations module to support new assets.

In some variations, the method includes at least one of: generating an account gateway S210, monitoring blockchain transactions S220, and processing a blockchain request S230.

2. Benefits

This method can confer several benefits over conventional systems.

First, by virtue of decoupling blockchain services from interfaces or modules used to communicate with the blockchain and/or generate blockchain-specific transactions, the system can be more easily updated to include support for processing of transactions for new blockchain networks. For example, new blockchain interfaces or transaction generating modules can be added to the system to support new assets, and existing blockchain services can send requests to these new modules and interfaces to interact with new blockchains.

Second, by virtue of decoupling blockchain services from interfaces or modules used to communicate with the blockchain and/or generate blockchain-specific transactions, blockchain-specific modules can leverage functionality of the blockchain service (e.g., 111), thereby allowing blockchain functionality to be shared across multiple blockchain-specific implementations. For example, a developer of a new blockchain can supply a module that provides asset-specific functionality, without implementing generic blockchain functionality provided by a blockchain service.

Third, third party systems can add blockchain-specific sub-modules to the operations module and the interface system to enable blockchain services to interact with new blockchain networks (or new versions, or forks, of existing blockchain networks).

Fourth, blockchain-specific functionality, such as determining finality of blockchain transactions that are broadcast to a blockchain network, can be performed by the interface system, thereby allowing developers to develop blockchain applications without implementing blockchain specific functionality for each supported blockchain network.

Fifth, the system can provide a multi-chain platform for developing and hosting blockchain applications (e.g., clients) that interact with multiple blockchain networks, wherein implementation of the blockchain service can be decoupled from implementation of blockchain-specific functionality.

3. System

Figure 1A:
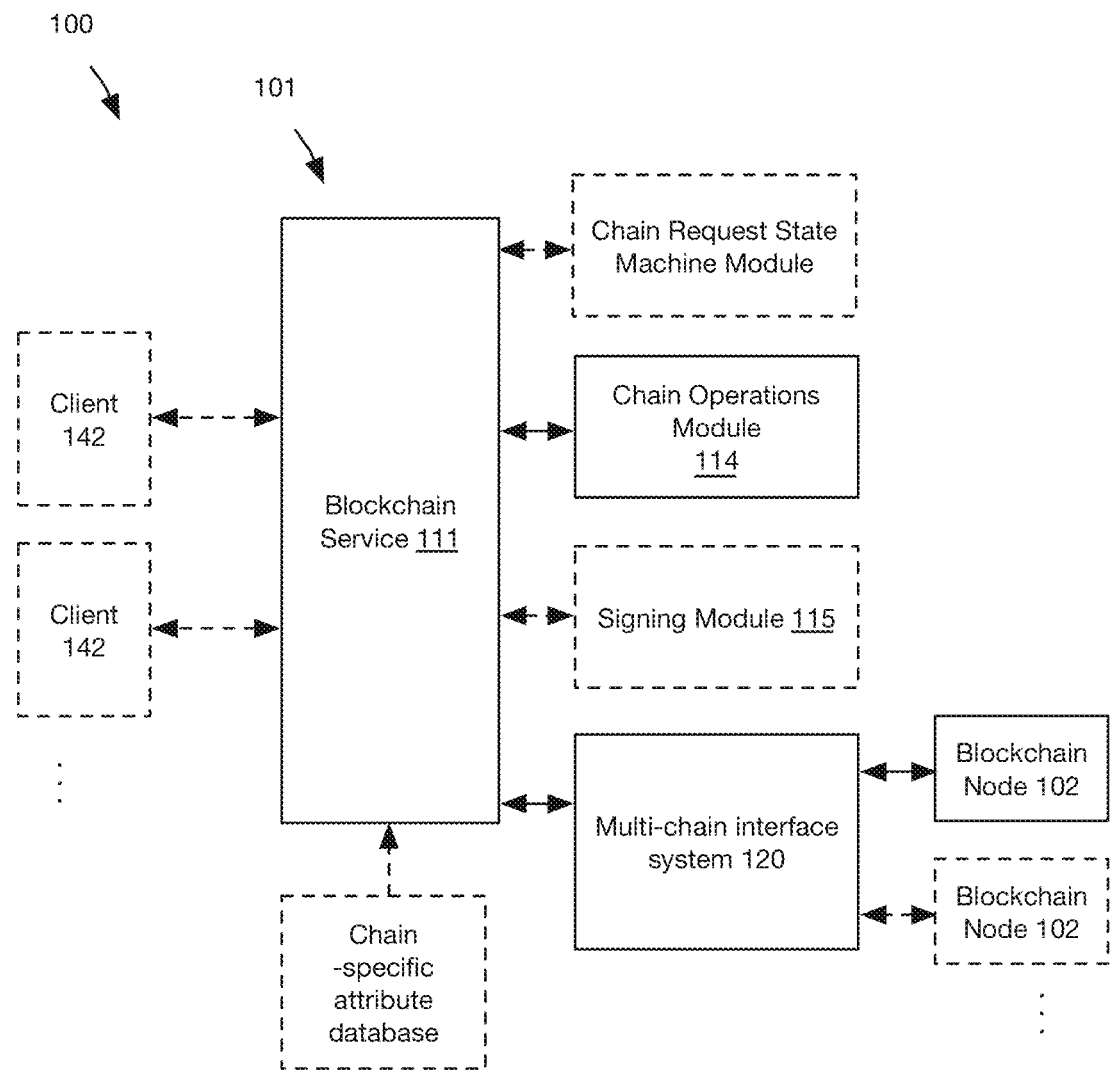
FIGS. 1A-B are schematic representations of systems, in accordance with embodiments.
Figure 1B:
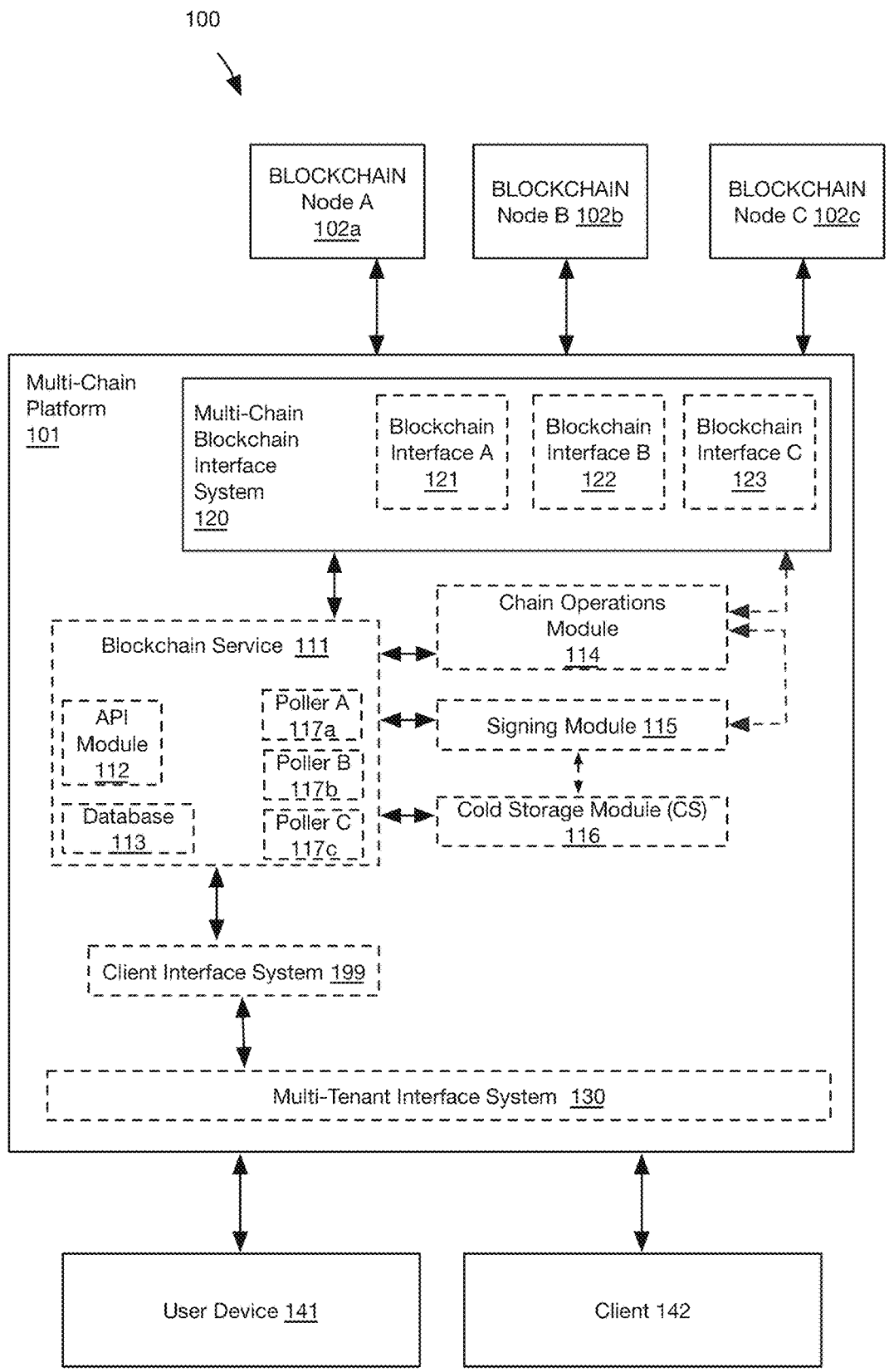

Variations of systems are shown in FIGS. 1A-B, 4 and 5A-I. As shown in FIGS. 1A and 1B, the system (e.g., 101) includes at least one of: a blockchain interface and a blockchain service (e.g., 111).

In some variations, the system 101 is a multi-chain platform for executing one or more blockchain services.

In some variations, the system 101 is implemented by using one or more servers (e.g., hardware servers, virtual server instances implemented by one or more hardware servers, etc.) that each execute machine-executable program instructions for controlling the system 101 to perform at least a portion of the method(s) disclosed herein.

In some variations, a blockchain interface includes a multi-chain interface system (e.g., 120). In some variations, the multi-chain interface system includes interfaces (sub-modules, e.g., 121-123) for each of a plurality of blockchain networks.

In some variations, the multi-chain interface system (e.g., 120) includes a set of blockchain-specific interfaces (sub-modules) for at least one blockchain node (e.g., 102*a-c*).

In some variations, the system 101 includes a developer interface that functions to receive interface sub-modules (e.g., 121-123) from an external blockchain developer system.

Figure 4:
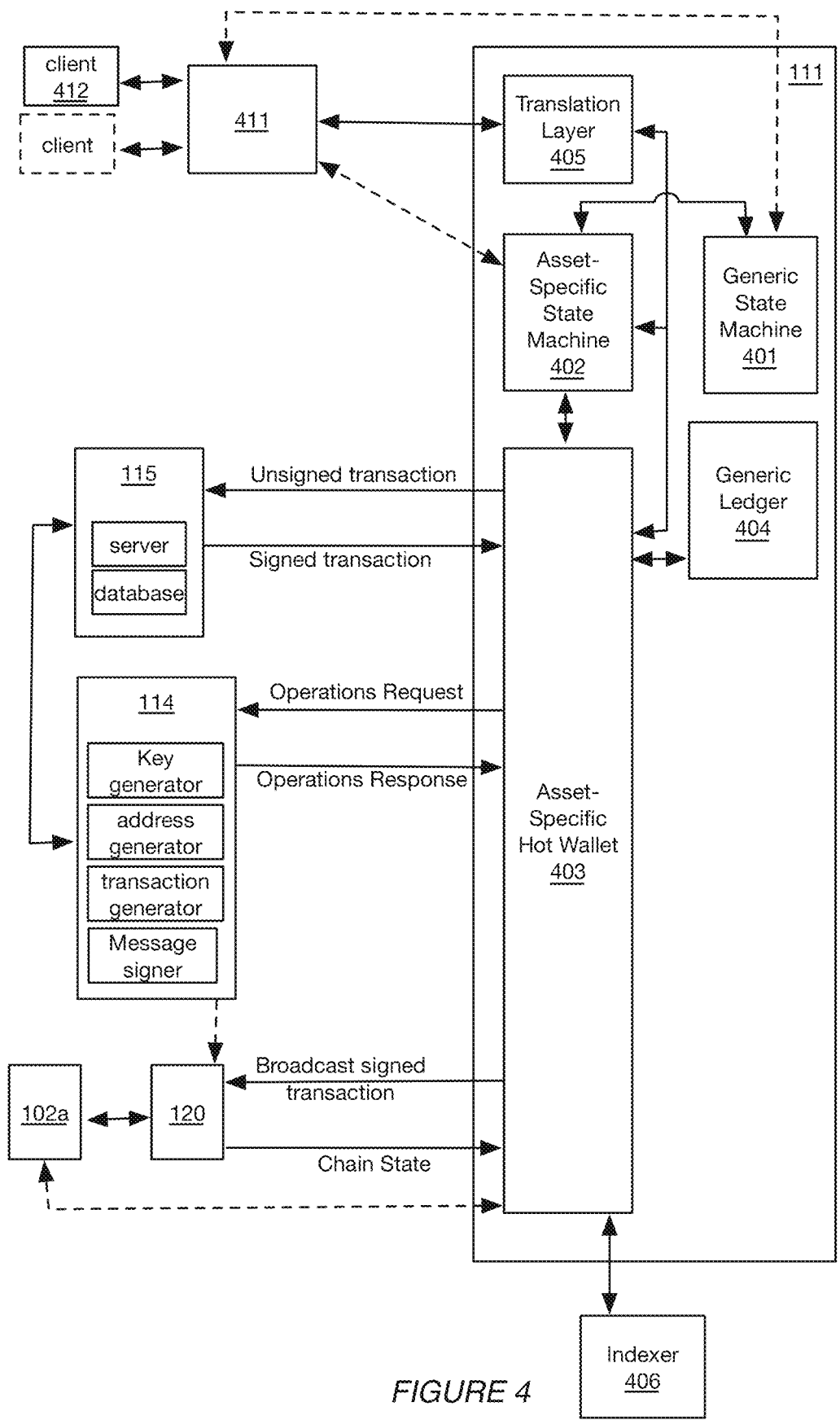
FIGS. 4 and 5A-I are schematic representations of systems, in accordance with embodiments.
Figure 5A:
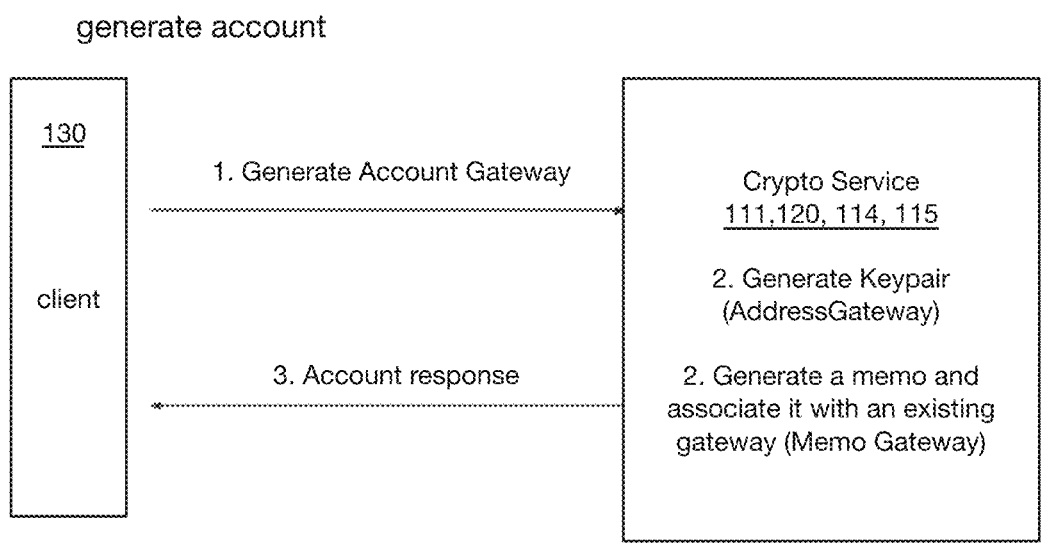
Figure 5B:
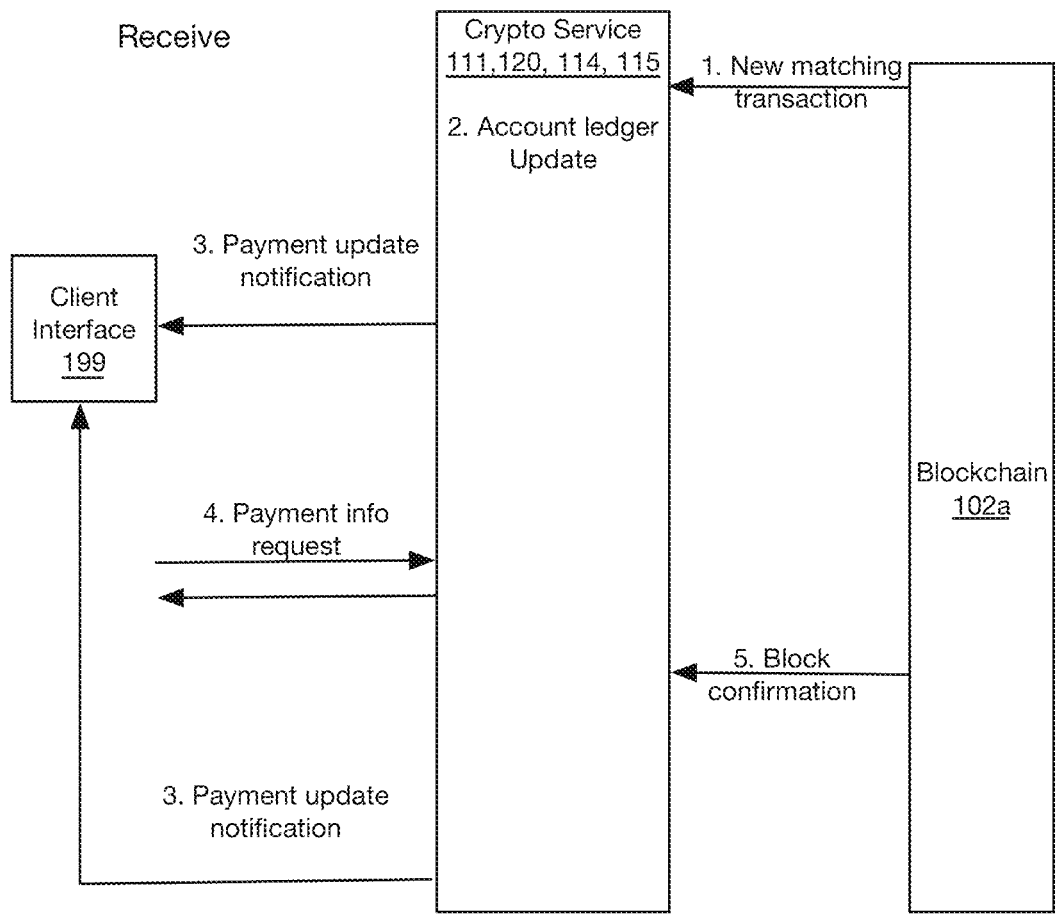
Figure 5C:
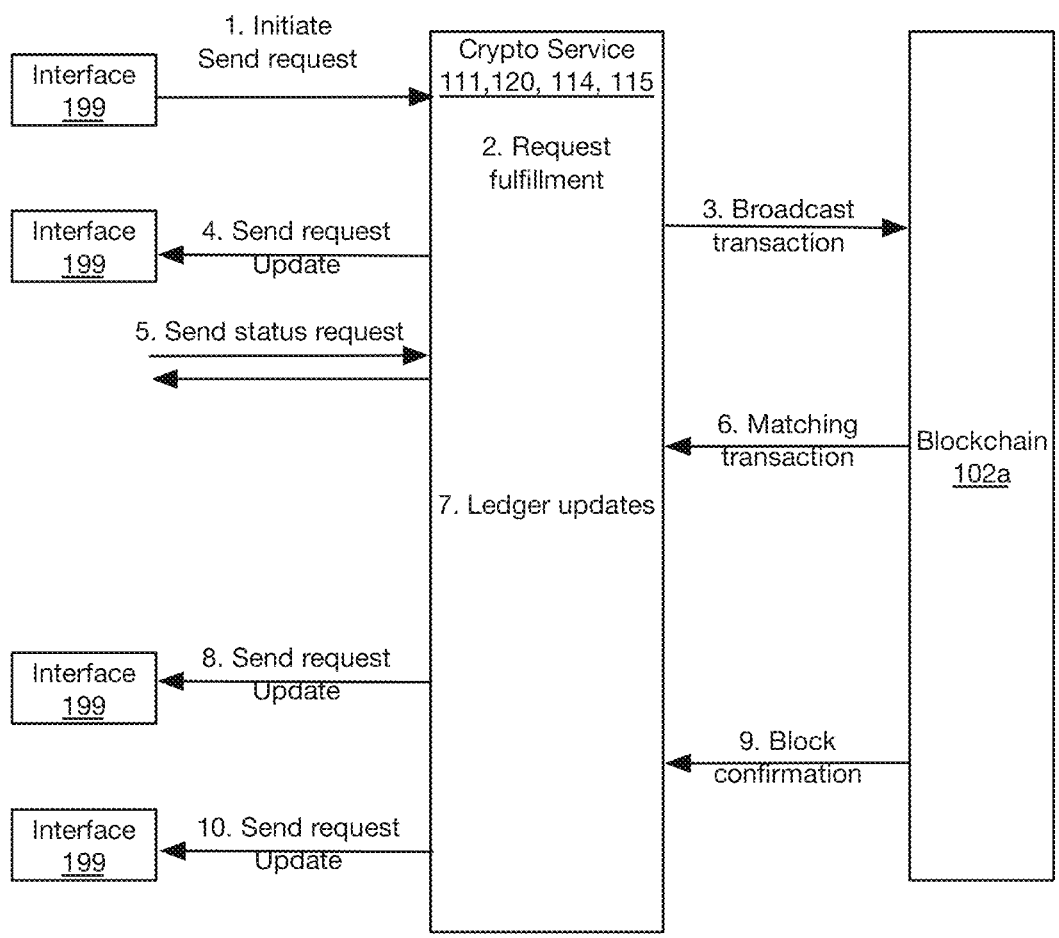
Figure 5D:
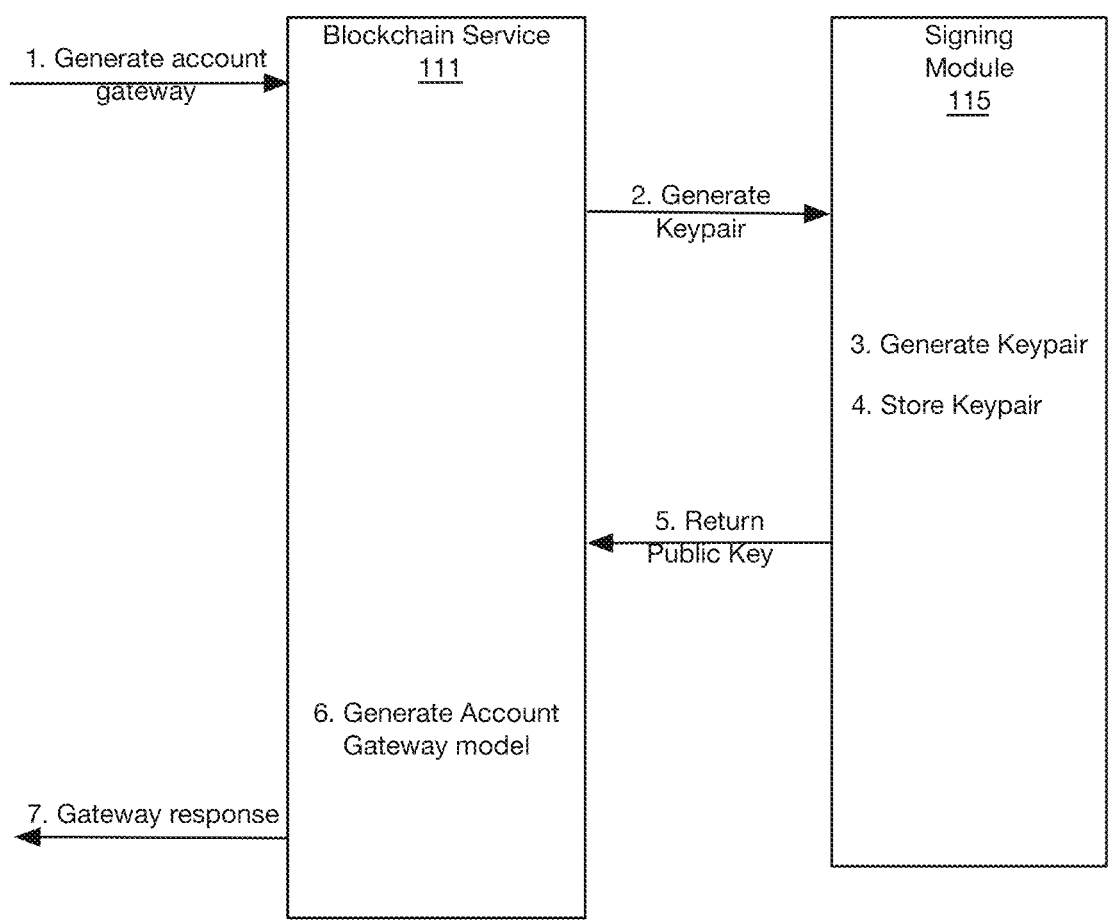
Figure 5E:
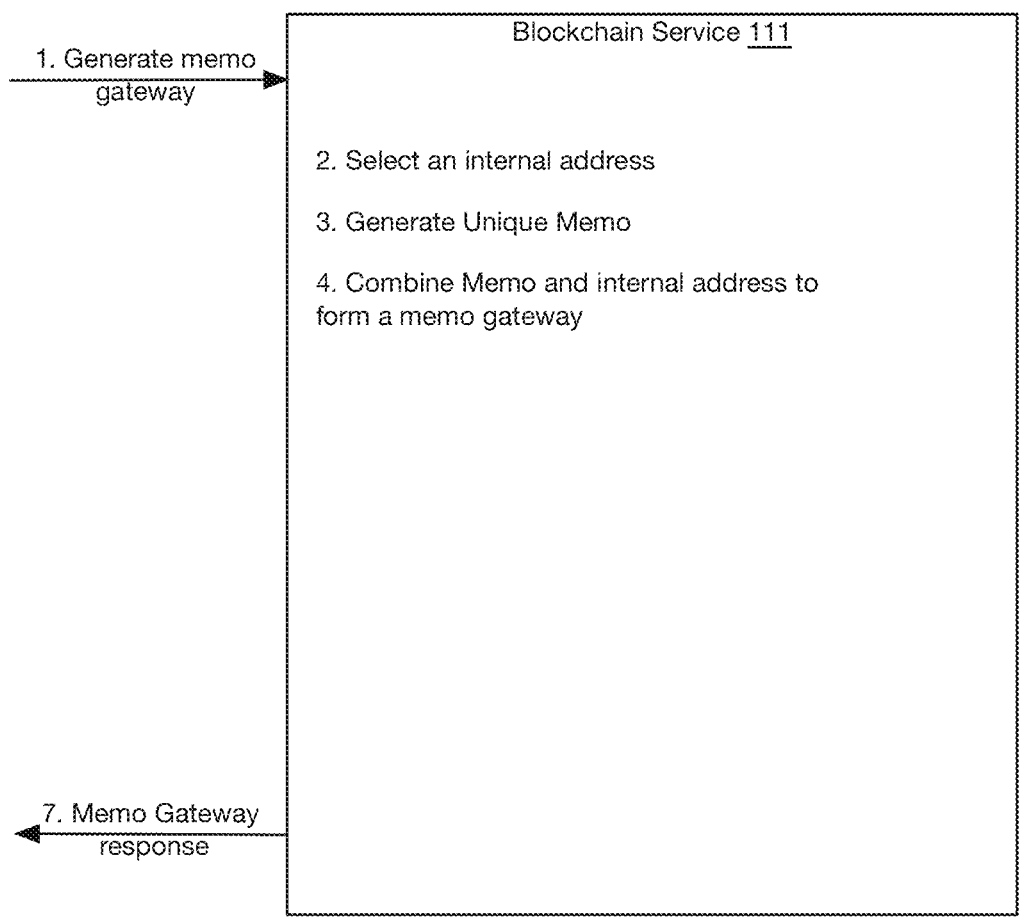
Figure 5F:
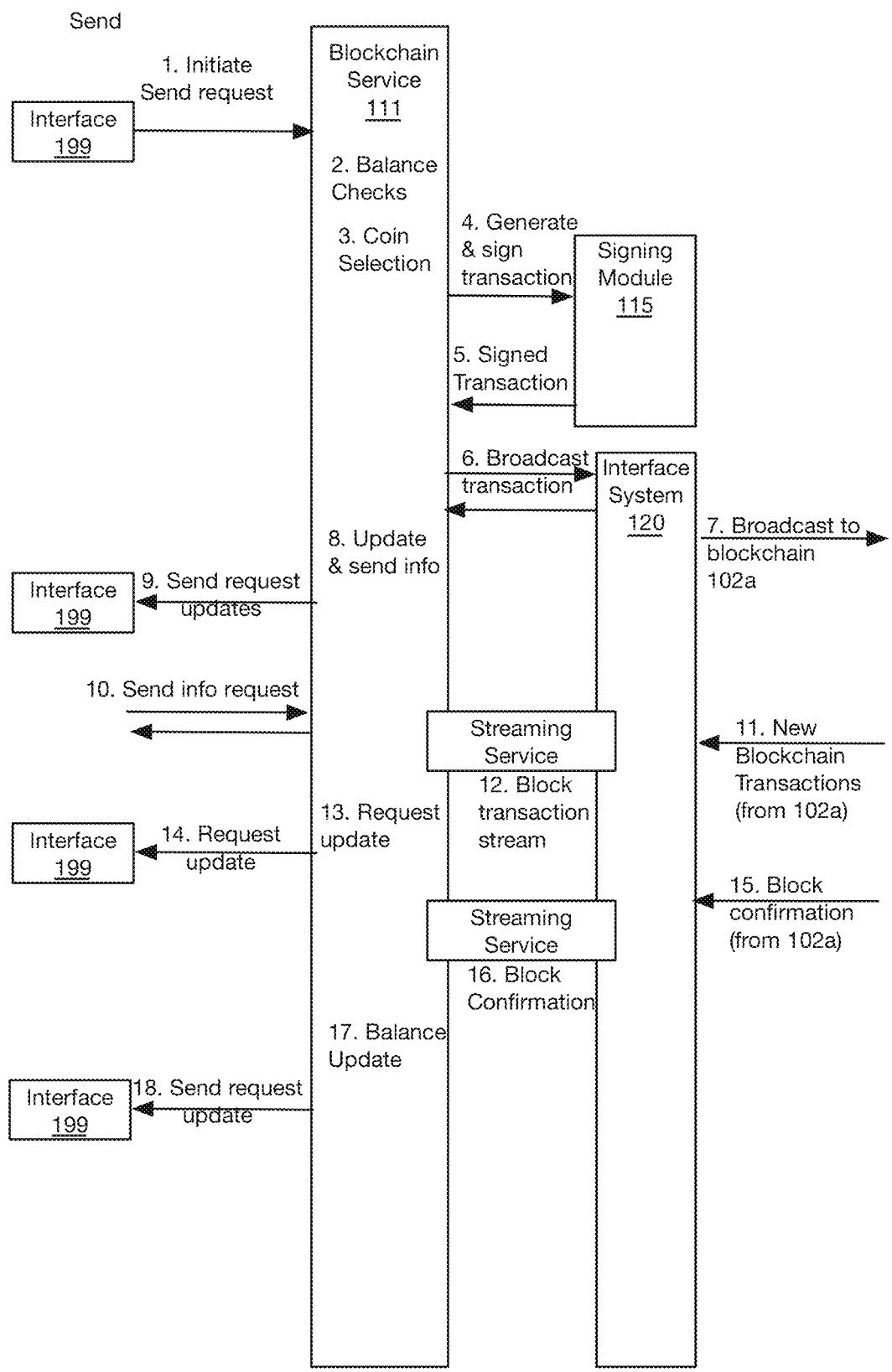
Figure 5G:
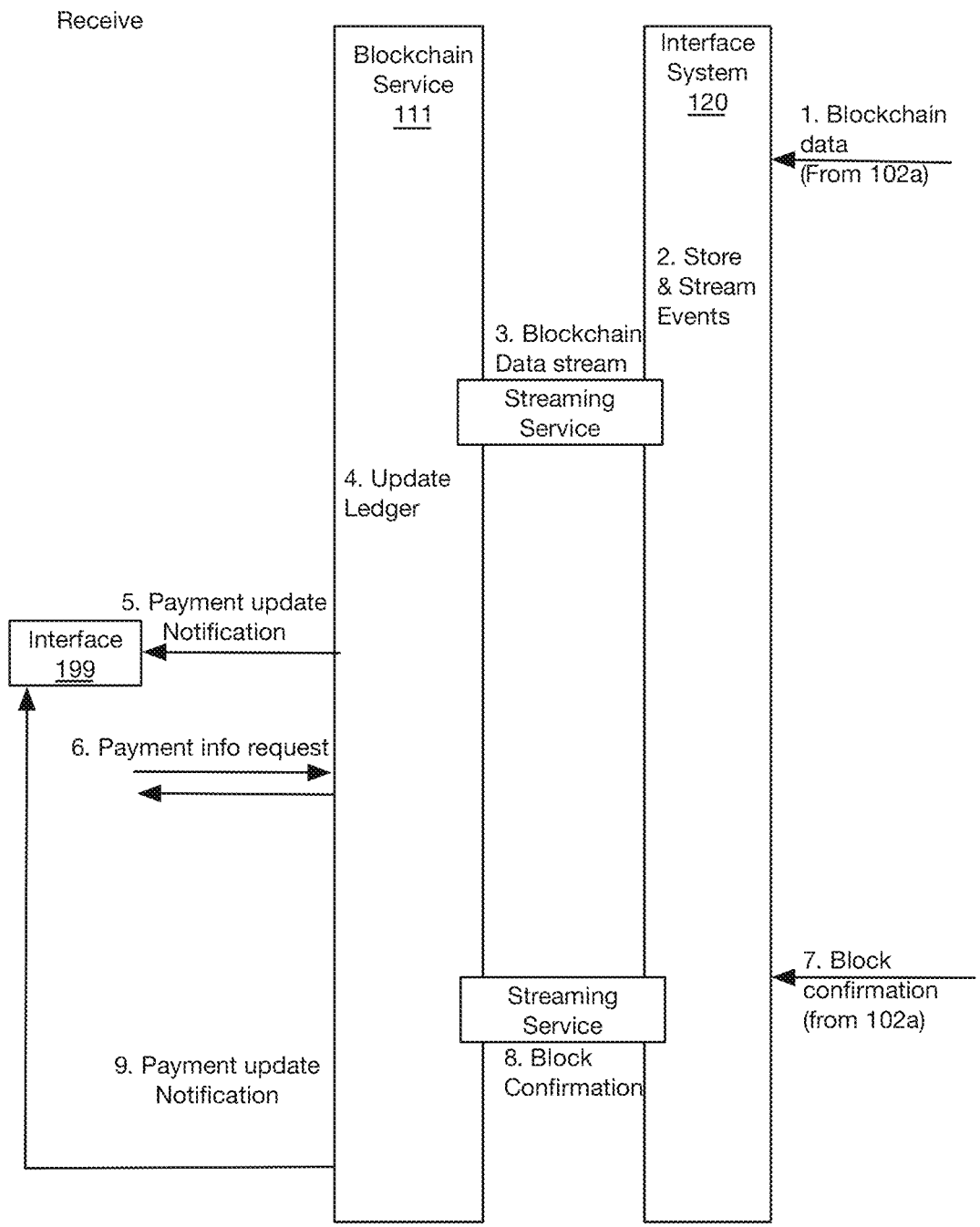
Figure 5H:
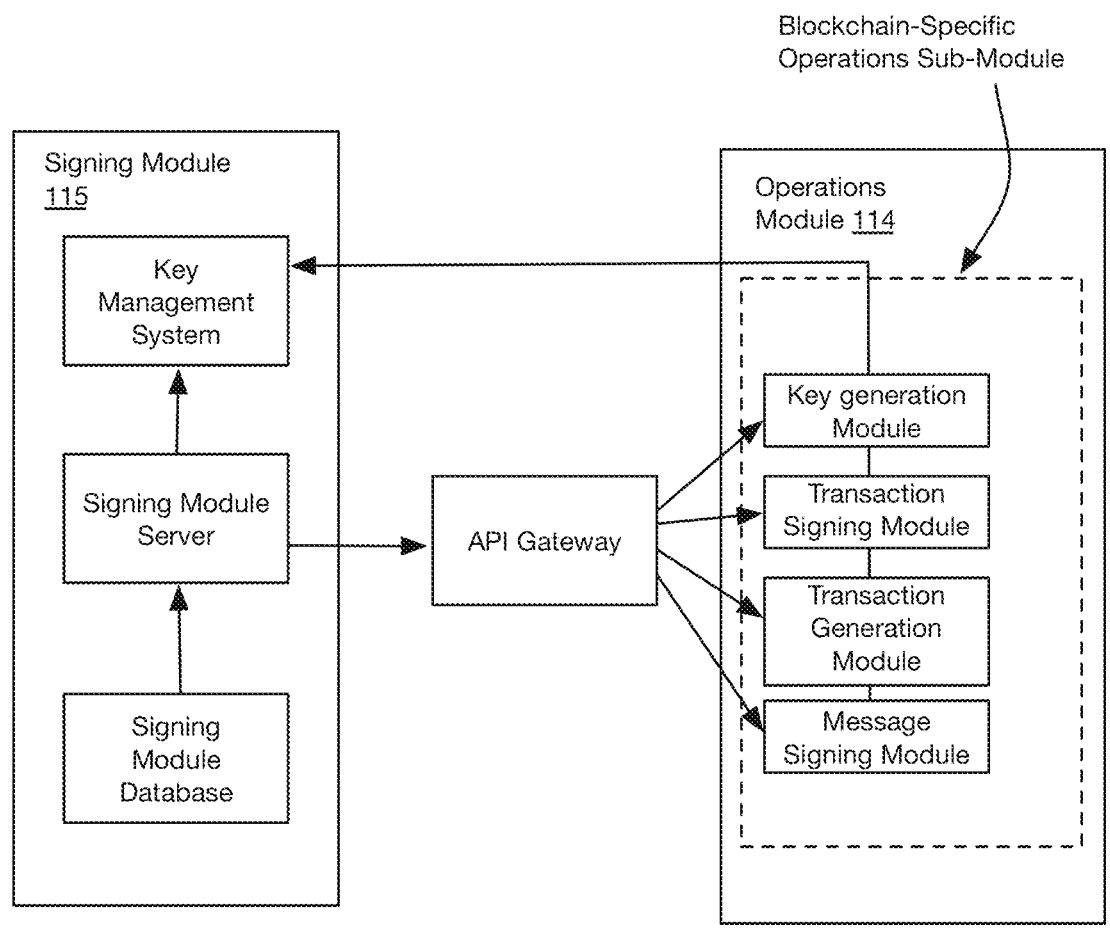
Figure 5I:
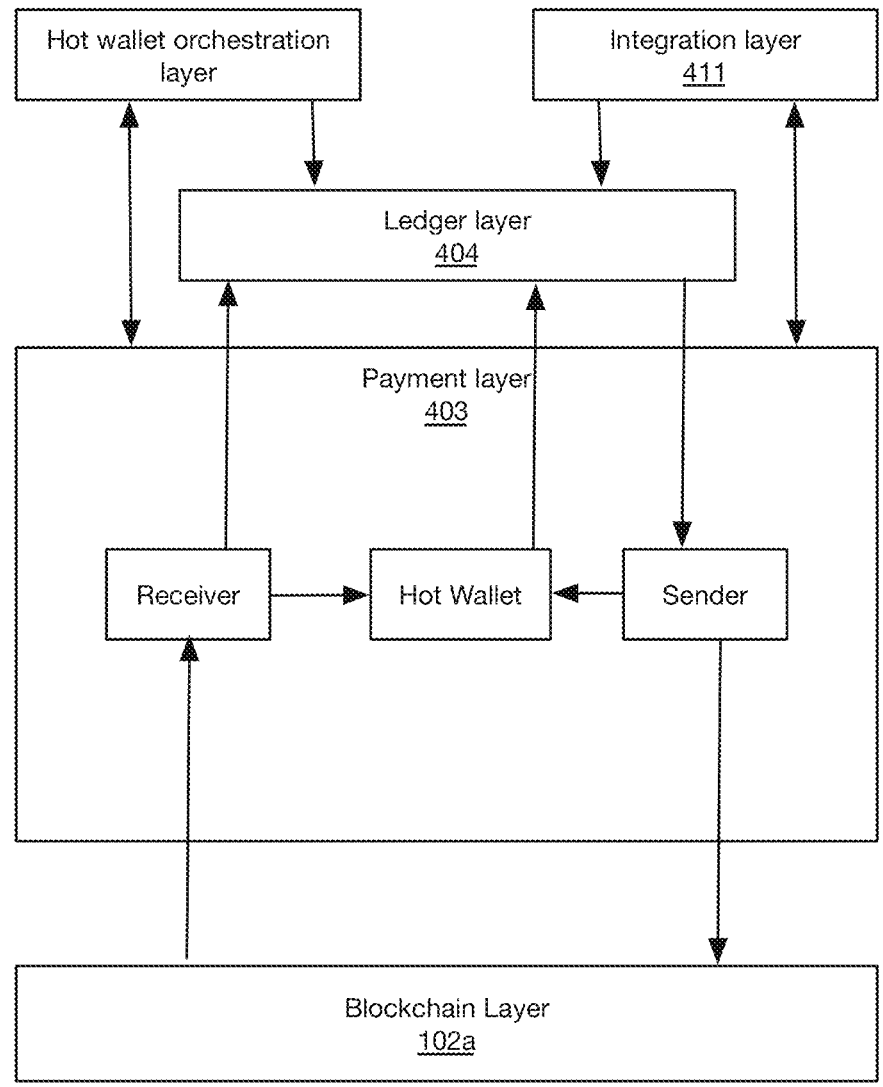

In some variations, the multi-chain interface system (e.g., 120) includes a set of interfaces (e.g., sub-modules 121-123) that function to perform at least one of: submitting a transaction to a blockchain node on behalf of a client, monitoring a blockchain node on behalf of the client, and providing state update information to the client and/or providing state update information to an asset-specific state machine (e.g., 402 as shown in FIG. 4). In some variations, each interface sub-module (e.g., 121-123) operates in accordance with a protocol of a blockchain network associated with the interface sub-module.

In some variations, the system includes one or more multi-chain operations modules (e.g., 114). At least one multi-chain operations module can be included in either the blockchain service (e.g., 111), or included in the system as a separate module that can be used by several blockchain services.

In some variations, the multi-chain operations module (e.g., 114) functions to perform asset-specific processes to execute blockchain verbs (e.g., actions, functions). The multi-chain operations module 114 can generate transactions for specific blockchain actions or functions. The operations module 114 can perform asset-specific processes to execute blockchain verbs by generating transactions in response to a request received from a component included in the platform 101 (e.g., the blockchain service) or a system external to the platform 101. In a first variation, the operations module 114 receives at least one attribute used to generate transactions from the component or system providing the request. In a second variation, the operations module 114 pulls at least one attribute from the component or system providing the request. In a third variation, the operations module 114 pulls at least one attribute from a system that is different from the system (or component) providing the request (e.g., from one or more databases storing chain-specific attributes and/or attribute values). For example, each operations module can include a template for each of a set of verbs (e.g., actions, functions), wherein the operations module generates and returns unsigned transactions using the variable values (passed to the operations module within the operation module request) and the template associated with the verb (e.g., identified by the operation module request). In a second example, an operations module can generate an account gateway, a new destination tag, a new address (e.g., cryptocurrency keypair), and/or any other suitable transaction identifier.

In some variations, the operations module 114 includes a plurality of operations sub-modules, and each operations sub-module operates in accordance with a protocol of a blockchain network associated with the interface sub-module. In some variations, the system 101 includes a developer interface that functions to receive operations sub-modules from an external blockchain developer system.

The blockchain service can be any suitable type of service that interacts with a blockchain. In a first variation the blockchain service is included in the platform 101. In a first example, the blockchain service is a hosted wallet application (e.g., 111). In a second example, the blockchain service is a platform service that performs actions based on information recorded on a blockchain (e.g., a rewarder service). In a second variation the blockchain service is external to the platform 101. In a first example, the external blockchain service is a third-party application that uses the platform 101 to perform blockchain transactions. In a second example, the external blockchain service is an external blockchain wallet application. In a third example, the external blockchain service is a rewarder service. However, any other suitable type of blockchain application can interact with one or more components of the platform 101 to perform blockchain related transactions. The blockchain service (e.g., iii) can be middleware that provides services to another application (e.g., 412 shown in FIG. 4) via an interface (e.g., 411 shown in FIG. 4).

In some variations, the blockchain service (e.g., 111) includes at least one of a generic blockchain state machine (e.g., 401 as shown in FIG. 4), an asset-specific state machine (e.g., 402), an asset-specific hot wallet management system (e.g., 403), a generic ledger (e.g., 404), and a translation layer (e.g., 405), which can perform one or more functions of the blockchain service, as described herein.

In some implementations, the blockchain service (e.g., 111) functions to broadcast signed blockchain transactions via a blockchain network by using the interface system 120, the operations module 114, and a signing module (e.g., a hot wallet signing module). In a variation in which the blockchain service includes an asset-specific state machine for an asset, the asset-specific state machine can perform or control the asset-specific functions of the blockchain service. In a variation in which the blockchain service includes a generic state machine, the generic state machine can perform the functions of the blockchain service that are generic across multiple blockchains. However, any suitable component (or group of components) of the blockchain service or the platform can broadcast signed blockchain transactions via a blockchain network by using the interface system 120, the operations module 114, and a signing module (e.g., a hot wallet signing module). In some implementations, the blockchain service controls the operations module 114 to generate an unsigned blockchain transaction, receives the unsigned blockchain transaction from the operations module 114, controls the signing module 115 to sign the unsigned blockchain transaction to generate a signed blockchain transaction, receives the signed blockchain transaction from the signing module 115, and controls the interface system 120 to broadcast the signed blockchain transaction via the blockchain network. In some implementations, the blockchain service receives blockchain information from the interface system 120 (e.g., a number of confirmations attributed to the signed transaction), and uses the received blockchain information to determine whether the signed transaction has been finalized in accordance with the protocol of the blockchain network.

In some implementations, the blockchain service functions to send funds on-chain. In some implementations, the blockchain service (an asset-specific state machine, e.g., 402) executes state-machine plugins that arbitrarily model acyclic state machines. In some implementations, the blockchain service ensures that these state machine plugins make progress, and handle configurable retry and failure cases.

In some implementations, the blockchain service includes one or more user-defined generic state machines (e.g., 401 as shown in FIG. 4) that define arbitrary acyclic state machines and blocks of code for state transitions. In some implementations, states can be annotated with "babysit" to let the generic blockchain state machine know that once an instance of a state machine has reached this annotated state, it can automatically apply state transition code. In some implementations, monitoring, metrics, and alerting will be generically built into this system, measuring throughput, queue depths, transition latency, failures, retries, and the like.

In some implementations, the blockchain service uses at least one generic state machine (e.g., 401) in combination with at least one asset-specific state machine to process blockchain requests. The generic state machine can perform a generic action related to processing a blockchain request. During performance of the generic action, the generic state machine (e.g., 401) generates information and provides the generated information to the asset-specific state machine (e.g. 402). The asset-specific state machine performs an asset-specific action related to processing the blockchain request, based on the information received from the generic state machine (e.g., 401). In some implementations, the action processed by the asset-specific state machine (e.g., 402) is defined by an asset-specific transaction plan that is represented by one of a graph structure and a tree structure. In some implementations, the action processed by the asset-specific state machine (e.g., 402) includes asset-specific processes that correspond to the generic action performed by the generic state machine (e.g., 401) (e.g., asset-specific processes defined by the asset-specific transaction plan). In some variations, asset-specific processes are performed in accordance with transition events, wherein processing transitions to a next asset-specific process in response to a transition event. In a first example, a transition event includes completion of an asset-specific process. In a second example, a transition event includes a notification from one or components of the platform (e.g., the operations module 114, the signing module 115, the interface system 120, etc.). Notifications from modules can include completion notifications, failure notifications, regeneration notifications, reorganization notifications, finalized notifications, and the like.

The transaction plan can be predefined; function as a template, wherein empty fields can be filled in based on parameter values received from the generic state machine, values fetched from a database, or preceding actions/operations (e.g., over the request lifecycle); or otherwise defined.

In implementations in which the blockchain service uses at least one generic state machine (e.g., 401) in combination with at least one asset-specific state machine to process blockchain requests, transaction plans can be used to identify asset-specific processes that correspond to the generic action performed by the generic state machine for the asset. In a first variation, each generic action is transformed into a transaction plan specific to the generic action for the asset. In a second variation, parameter values received from the generic state machine are used to populate a transaction plan that is used for all generic actions for the asset. However, transaction plans can be otherwise used to identify asset-specific processes that correspond to the generic action performed by the generic state machine for the asset.

Figure 7:
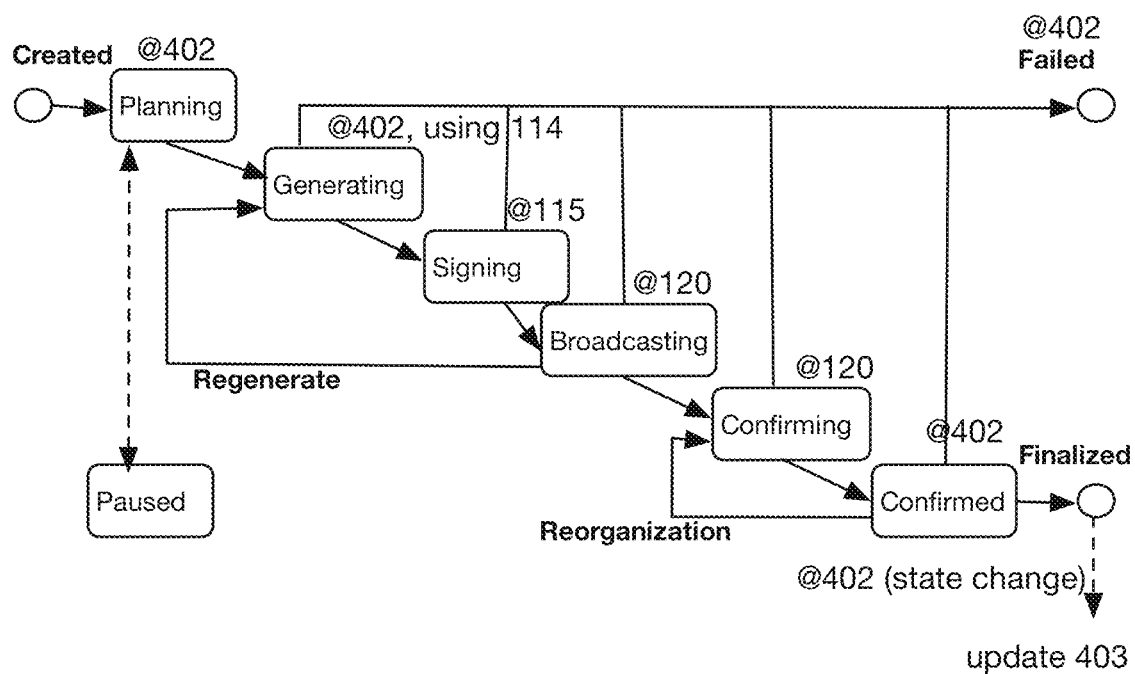
FIG. 7 is a representation of a state machine, in accordance with embodiments.

FIG. 7 shows an exemplary state machine managed by the asset-specific state machine (e.g., 402 as shown in FIG. 4). As shown in FIG. 7, the asset-specific state machine 402 initiates a "Planning" state and then transitions to a "Generating" state. In the "Generating" state, asset-specific state machine 402 uses the operations module 114 to generate a transaction. Thereafter, state transitions to a "Signing" state, where the signing module 115 (e.g., key management system, a cold storage system, a cold storage managed by the signing module, etc.) signs the transaction. Thereafter, state transitions to the "Broadcasting" state, where the interface system 120 broadcasts the signed transaction via the blockchain network by using a blockchain node (e.g., 102*a*). Thereafter, state transitions to a "Confirming" state, where the interface system 120 determines whether the signed transaction has been confirmed on the respective blockchain. If the signed transaction has been confirmed, then state transitions to "Confirmed" and the asset-specific state machine 402 changes state to "Finalized" and updates asset-specific ledger 403 of the state change.

In some implementations, the blockchain service functions to receive funds on-chain. The blockchain service can use an asset-specific hot wallet management system (e.g., 403) to receive funds on-chain. In some implementations, the blockchain system uses a double entry ledger (asset-specific ledger) for bookkeeping. In some implementations, a generic ledger (e.g., 404) of the blockchain service functions as a template, and an asset-specific hot wallet management system of the blockchain service populates the asset-specific ledger with entries based on a generic ledger 404. In some implementations, the asset-specific ledger includes "holds" functionality to reserve funds, and a balance cache for quickly querying balances. In some implementations, "hold functionality" represents a hold on funds for a particular ledger account. In some implementations, coin selection (the act of selecting a set of accounts with balances high enough to fulfill a movement of funds) is performed by using the asset-specific ledger.

In some implementations, the blockchain service records balances of blockchain addresses (or accounts) based on blockchain information received via the interface system 120 (e.g., by using an asset-specific hot wallet management system). In some implementations, blockchain service identifies transfer of funds to blockchain addresses (or accounts) managed by blockchain service, based on blockchain information received via the interface system 120. The blockchain service identifies transfer of funds to blockchain addresses (or accounts), as described below with respect to process S220 of the method 200.

In some implementations, blockchain service uses a generic ledger (e.g., 404) to track account balances. In some implementations, the generic ledger has a hold system for reserving funds, and a balance cache for quickly accessing balances.

In some implementations, the blockchain service uses a translation layer (e.g., 405) to translate data generated by at least one of an asset-specific state machine (e.g., 402) and an asset-specific hot wallet management system (e.g., 403) into a format that the interface 411 shown in FIG. 4 can parse and understand. In some implementations, the translation layer (e.g., 405) functions to translate generic requests into asset-specific requests intended for at least one of the asset-specific state machine (e.g., 402) and the asset-specific hot wallet management system (e.g., 403). In some implementations, the translation layer (e.g., 405) functions to translate asset-specific state-information into generic state information. In a first example, the asset-specific state-information includes information generated by the asset-specific state machine (e.g., 402). In a second example, the translation layer (e.g., 405 shown in FIG. 4) functions to receive information from the asset-specific hot wallet management system 403, translate the received information into a format expected by a client application (e.g., 412), and provide the translated information to the client application (either directly, or via an interface, such as, for example, 411 shown in FIG. 4)

In some variations, the system includes an indexer (e.g., 406 shown in FIG. 4) that functions to index information received from at least one of a blockchain node (e.g., 102a-c), a blockchain service (e.g., the asset-specific hot wallet management system 403 shown in FIG. 4), and the asset-specific state machine (e.g., 402).

In some implementations, the asset-specific hot wallet management system 403 functions to perform at least one of: receiving funds on-chain, managing reserve funds, managing a balance cache, coin selection, cold storage transfer, inbound to outbound wallet sweeps.

In some implementations, as shown in FIG. 1B, the blockchain interface system 120 includes blockchain interfaces (e.g., 121-123) (sub-modules) for a plurality of types of blockchain nodes (e.g., 102a-102c).

In some implementations, as shown in FIG. 1B, multi-chain (multiple blockchain) platform 101 includes at least one of: a user interface system (e.g., 130), a signing module (e.g., 115), a client interface system (e.g., 199), and a cold storage module (e.g., 116). In some implementations, one or modules of the platform 101 can be included in an application system.

In a first variation, the blockchain service 111 includes at least one of an API (Application Programming Interface) module (e.g., 112), a database module (e.g., 113), and a poller for each supported blockchain (e.g., 117a-c). In a second variation, at least one of the API (Application Programming Interface) module (e.g., 112), the database module (e.g., 113), and a poller (e.g., 117a-c) is separate a separate service that can be used by any blockchain service (e.g., 111, a different blockchain service within the platform 101, an off-platform blockchain service, etc.). In some implementations, the signing module (e.g., 115) interacts with the multi-chain operations module (e.g., 114). In some implementations, the multi-chain blockchain interface system 120 includes at least one of the pollers. In some implementations, an asset-specific state machine (e.g., 402 as shown in FIG. 4) (included in the blockchain service) includes at least one of the pollers. In some implementations, the client interface system (e.g., 199) functions to interact with multiple clients of the application system 110. In some implementations, the client interface system (e.g., 199) includes a translation layer (e.g., 405 shown in FIG. 4). In some implementations, the client interface system (e.g., 199) is similar to the interface 411 shown in FIG. 4. In some implementations, the database 113 includes a ledger (e.g., 404 shown in FIG. 4). In some implementations, the API module 112 includes a translation layer (e.g., 405 shown in FIG. 4).

In some implementations, each poller functions to poll for updates to blocks, transactions, and addresses of the respective blockchain by interacting with the blockchain interface system 120. In some implementations, each poller functions as a transaction receiver that receives new blockchain blocks from the a respective one of the blockchain interfaces 121-123, translates each received block into one or more Operations (as described herein, and shown in FIG. 3). In some implementations, all Operations (as disclosed herein) are generated by a poller.

In some variations, the operations module (e.g., 114) includes an operation sub-module for each blockchain supported by the hosted wallet system. Each operation sub-module functions to perform a blockchain operation process in accordance with a blockchain protocol for a specific type of blockchain. The operation sub-modules can be implemented in AWS Lambdas™, but can additionally or alternatively be implemented in dedicated containers, servers (e.g., dedicated or dynamically allocated), or otherwise implemented. In some implementations, each operation sub-module performs at least one of the following processes for a blockchain network associated with the sub-module: account generation (e.g., keygen, derive); transaction signing; transaction generation; message signing; or any other suitable process. In variants, the signing module 115 can call an API gateway (for the operations module) to invoke specific operation sub-modules (e.g., based on an instruction from the blockchain service or component thereof). However, the blockchain service or any other suitable component can call the specific operation sub-modules.

In some variations, blockchain network nodes 102a-c are nodes of a blockchain network operated according to a respective blockchain protocol. In preferred embodiments, the blockchain network is a cryptographic currency network (CCN), wherein the blockchain is implemented with a cryptocurrency protocol, such as Ripple, Stellar, EOS, Tezos, Cosmos, Etherium, Bitcoin, or any other cryptocurrency protocol. In various embodiments, such cryptocurrency protocols are implemented via node software running on the nodes 102a-c, and may include Ripple, Stellar, EOS, Tezos, Cosmos, Etherium, Bitcoin, or any cryptocurrency protocol implemented in one or more ways. The node software can connect to the blockchain network, persist the chain state to a datastore, and/or perform other tasks (e.g., manage a hot wallet for the blockchain, generate addresses, store private keys, sign transactions, etc.). In some embodiments, the blockchain network is a network in which one or more digital cryptocurrencies are bought, sold, and/or transferred. In some embodiments, the blockchain network includes one or more smart contracts or other programs operating on top of the blockchain protocol.

In some variations the platform 101 functions to generate accounts and gateways, receive deposits of currency, allow withdrawals of currency, and keep track of deposits and withdrawals (payments) for all accounts.

In some variations, accounts managed by the blockchain service are entities that can possess funds in a specific currency. They are created by calling an API endpoint (e.g., of the API module 112, the client interface system 199, etc.). For example, the multi-tenant user interface system can call an API endpoint of the API module to create an account, responsive to user input received from a user device or client (e.g., 141, 142). An account of the blockchain service can have many gateways that determine how the deposits are associated with it are mapped to blockchain addresses (of a blockchain node, e.g., 102a-c). Each Gateway belongs to a single Account. A Gateway has an optional memo field for blockchains whose deposits require it.

In some variations, external consumers of the API module 112 (e.g., user interface system 130) track the balance for Accounts themselves. In some variations, the blockchain service 111 generates Payments associated with these Accounts, which act as "deltas." In some variations, the blockchain service 111 handles logic for managing deposits, and withdrawals from a fleet of hot wallets (e.g., managed by the signing module 115) on behalf of Accounts, but the blockchain service 111 is not required to keep track of account balances. In other variants, the system 101 tracks the Account balances (e.g., balances of hot wallets used by the system 101).

In some variations, the platform 101 functions to manage accounts, which includes managing receipt of funds by an Account when a transaction of a Gateway of the Account is confirmed and finalized on the blockchain associated with the Gateway. Once a deposit is detected, a Payment to that Account is created. Managing accounts also includes withdrawing funds of a specified currency and quantity from an account to a specified destination address. In some variations, the blockchain service 111 functions to perform fund selection from an available hot wallet (managed by the signing module 115) and ensures those funds are moved to the destination on the blockchain. Once a withdrawal is broadcasted to the blockchain and finalized, the appropriate Payment from that Account is created.

In some variations, each blockchain interface sub-module (e.g., 121-123) functions to read/write to an associated blockchain network by interacting with a corresponding blockchain node (e.g., 102a-102c).

In some variations, the signing module 115 functions to perform at least one of: control of keypair generation, storage of keys, and control of transaction signing with stored keys. In some variations, the signing module 115 is a hot wallet module. In some variations, the signing module 115 functions to generate transactions. In one variation, singing module 115 is executed on a processing system (e.g., remote processing system, server, etc.) that responds to address generation and transaction signing requests (e.g., received from the blockchain service). In some variations, the signing module 115 securely sends the requests (e.g., address generation requests, transaction signing requests) to an API gateway of the operations module 114 (e.g., wherein a blockchain specific sub-module included in the operations module 114 executes the requested operations), transforms the responses from the operations module 114, and stores the results. In another variation, the signing module 115 receives the request (e.g., address generation request, transaction signing request) from upstream services, selects the operation sub-modules associated with the identified cryptocurrency, and executes the operation sub-module to fulfill the request itself. However, the signing module 115 can otherwise fulfill address generation requests and transaction signing requests.

In some variations, the signing module 115 has access to a database that stores all or a portion of the signing keys (e.g., private keys). The keys in this database are preferably encrypted (e.g., using AES-256), and can optionally be sharded (e.g., Shamir sharded) or otherwise secured. The platform 101 can optionally include a master key to decrypt these encrypted keys, wherein the master key can be stored in-memory in each server instance of the platform 101. The master key can optionally be encrypted, Shamir sharded and distributed to a number of shard holders, or otherwise secured. Each time the signing module 115 is deployed (e.g., a new instance of the signing module 115 is deployed), the shard holders can be instructed to post their shards to all the new instances of the signing module 115.

In some variations, the signing module 115 includes one or more of: a key management module, a key generation module, a transaction signing module, a transaction generation module and a message signing module.

In some implementations, the signing module 115 includes one or more of: a database, a server, a key management module, a key generation module (public key and private key generation), a transaction signing module, a transaction generation module and a message signing module. In some implementations, at least one module included in the signing module 115 is specific to the cryptocurrency or blockchain, but can alternatively be shared between cryptocurrencies that have similar attributes (e.g., include a set of sub-modules for account-based cryptocurrencies, include a subset of sub-modules for destination tag with pool cryptocurrencies, and include a second set of sub-modules for UTXO-based cryptocurrencies), or otherwise shared.

In some variations, the operations module 114 includes, for a plurality of blockchain networks, blockchain-specific implementations of one or more of: a key management module, a key generation module (public key and private key generation), a transaction signing module, a transaction generation module and a message signing module. In some implementations, the signing module 115 provides to the operations module 114 a request to perform at least one of key management, a key generation (public key and private key generation), transaction signing, transaction generation and a message signing, and the operations module 114 processes the request by using blockchain-specific sub-modules for the blockchain network associated with the request. In some implementations, each module (and sub-module) described herein includes machine-executable instructions (stored on a non-transitory processor-readable storage medium of the platform 101) that (when executed by at least one processor of the platform 101) control the platform 101 to perform a respective process (e.g., key generation, transaction generation, transaction signing, message signing).

In some implementations, at least one component of the platform 101 (e.g., operations module 114) includes a key generation module for each blockchain network supported by the platform 101. In some implementations, each key generation module functions to generate a keypair that includes a public key and matching private key.

In some implementations, at least one component of the platform 101 (e.g., operations module 114) includes a transaction signing module for each blockchain network supported by the platform 101. In some implementations, each transaction signing module functions to access a private key associated with a "from" address (or account) identified in transaction metadata of the transaction to be signed, and sign the transaction by using the private key. In some implementations, the transaction metadata includes data identifying the "from" address (or account), a "to" address (or account), and an amount. Alternatively, the "from" address can be automatically determined by the platform 101. In some implementations, the transaction metadata includes data identifying at least one option.

In a first variation, the transaction metadata includes data identifying an outbound hot wallet. In a second variation, operations module 114 selects an outbound hot wallet for the transaction. However, any other suitable component of the platform 101 can select the outbound hot wallet. In a first example, an outbound hot wallet that is not in use is selected. In a second example, an outbound hot wallet that is not assigned to an incomplete transaction is selected. In a third example, an outbound hot wallet for the asset associated with the transaction is selected. In a fourth example, an outbound hot wallet associated with a particular platform user is selected. In a fourth example, an outbound hot wallet identified in the request for the transaction is selected.

In some implementations, at least one component of the platform 101 (e.g., operations module 114) includes a transaction generation module for each blockchain network supported by the platform 101. In some implementations, each transaction generation module functions to generate a raw unsigned transaction for the transaction for transaction metadata of the transaction to be generated. In some variations, the operations module 114 generates a recipient account gateway for the transaction, as described for process S210 of the method 200. However, the operations module 114 can generate any other suitable transaction identifier for the transaction.

In some implementations, at least one component of the platform 101 (e.g., operations module 114) includes a message signing module for each blockchain network supported by the platform 101. In some implementations, each message signing module functions to sign a raw string.

In some variations, the blockchain service 111 functions to process blockchain send and receive requests, and maintain account balances in a ledger (e.g., stored by the database 113 shown in FIG. 1B).

In some variations, the blockchain service 111 manages a plurality of blockchain models, wherein each blockchain model is a data structure that includes information for at least one of a blockchain network, a blockchain transaction, a blockchain transaction operation, a blockchain block, and a blockchain address.

In some variations, a network model functions to represent a blockchain-network relationship. In some variations, each network model can identify one or more of: a blockchain (e.g., network archetype), such as, for example, "stellar", "bitcoin, "eos", "tezos", cosmos", ethereum", etc.; a network name (e.g., "mainnet", "testnet"); confirmation requirements (the number of confirmations before a transaction is considered finalized).

In some variations, a transaction model functions to represent an atomic transaction unit (e.g., a structure that defines transaction operations). Each transaction model can identify a block index that identifies the transaction within a block of a blockchain.

In some variations, a transaction operation model functions to represent a transaction operation for an atomic transaction unit (e.g., an operation performed in connection with a transaction represented by a transaction model). Each transaction operation model can identify a corresponding transaction (e.g., transaction model identifier), a "To" address, and a "from" address. In some implementations, a transaction operation model identifies a sequence number (e.g., an order of the operation within a transaction). In a first variation, the blockchain service generates the sequence number. In a second variation, the operations module 114 generates the sequence number. However, any suitable component of the platform 101 can generate the sequence number. In some implementations, a transaction that includes multiple "To" addresses includes a transaction operation for each "To" address.

In some variations, a block model functions to represent a group of ordered transactions (represented by corresponding transaction models). In some implementations, each block model identifies the network (e.g., network model) that the block was seen on.

In some variations, an address model functions to represent a blockchain address on a given network. In some implementations, each address model identifies a blockchain address and the corresponding blockchain network (e.g., network model). In some variations, an address model functions to keep track of balances. Balances can be tracked in a jsonb field that maps currency to balance. In some implementations, the primary key of an address model is a UUID. In some implementations, an address model identifies an address type. In some implementations, address types include at least one of: hot-wallet, cold-storage, custody, and external. A hot wallet is used for outgoing withdrawals. A cold storage system is used for secure storage. A custody address is a one-time-use custody wallet address. An external address is an off-platform address (e.g., an address that is not managed by the wallet system 101.

In some implementations, each address model identifies at least one of: a blockchain network (e.g., "stellar", "bitcoin, "eos", "tezos", cosmos", etherium"); an address; a balance; a locked flag; a sequence value; and an address type.

In some variations, the blockchain service 111 manages a request namespace that includes a plurality of request models, and an operation namespace that includes a plurality of operation models. In some variations, each request model is a data structure that includes information for a request that is provided by the user interface system 130 (via the API module 112) or a request initiated by the blockchain service 111. Example requests initiated by the blockchain service can include a flush request, a sweep request, a restore request, or any other suitable request initiated by the blockchain service 111 independently of user-input. In some variations, each operation model is a data structure that includes information for an operation observed on a blockchain (e.g., by using the blockchain interface system 120). Example operation models include operations models for deposits, withdrawals, flush operations, sweep operations, restore operations, custody operations, maintenance operations, and any other suitable type of operation observed on a blockchain. The requests and/or operations are preferably generic, and translated to asset-specific outputs by the system, but can additionally or alternatively be asset-specific. The generic requests and/or operations can include an asset identifier as an input or output variable, respectively, but the asset associated with the request and/or operation can be determined (e.g., estimated) based on the address variable value or otherwise determined. FIG. 3 shows a table that defines request models and operation models, according to some implementations.

In some implementations, at least one process performed by the platform 101 is implemented by a remote computing platform (e.g., AWS Lambdas™, dedicated containers, servers (e.g., dedicated or dynamically allocated), or etc.). Such processes can include processes performed by one or more of the interface system 120, the operations module 114, the signing module 115, the cold storage module 116, or any other suitable module included in the platform 101.

4. Method

Figure 2A:

FIGS. 2A-B are flowchart representations of a method 200. In some variations, the method 200 is performed by at least one component of the system 100. The method 200 includes at least one of: generating at least one account gateway S210; monitoring blockchain transactions for each generated account gateway S220; and processing at least one blockchain request S230.

S210 can include: generating a plurality of gateways for an account (e.g., an account managed by the blockchain service 111), each gateway being a gateway for a different blockchain network.

In some variations, S210 includes: generating an account gateway for a blockchain network in response to an account gateway request received from the blockchain service 111. In some implementations, the account gateway identifies the blockchain network. In some implementations, the signing module 115 generates the account gateway. In some implementations, the signing module 115 generates the account gateway by using a blockchain-specific sub-module included in the operations module 114. In some implementations, the operations module 114 generates the account gateway. In some implementations, the blockchain service 111 controls a blockchain-specific sub-module included in the operations module 114 to generate the account gateway (e.g., by directly communicating with the sub-module, communicating with the sub-module via the operations module 114, communicating with the sub-module via the signing module 115, etc.). In some implementations, generating an account gateway includes generating a kay pair that includes a public key and a private key for a user account managed by the blockchain service 111.

In some variations, generation of an account gateway is performed in response to receiving a gateway generation API request (e.g., via the blockchain service 111, via the API module 112, etc.). In some implementations, the gateway generation API request is received from the user interface system 130. In some implementations, gateway generation API request is a request for requesting a new account gateway to be generated. In some variations, the gateway generation API request specifies an account to be associated with the gateway. In some variations, the gateway generation API request specifies a blockchain network, and the gateway generation API request is a request to generate a gateway for the specified blockchain network.

In some variations, in a case of an address gateway, generating an account gateway includes generating a keypair (that includes a public key and a private key) and securely storing the keypair S211. In some variations, the blockchain service 111 provides a request to the signing module 115 to generate and securely store the keypair. In some implementations, securely storing the keypair includes encrypting the private key of the key pair. In some implementations, the signing module 115 encrypts the private key and stores the private key in a database included in the signing module 115. In some implementations, the public key of the keypair is an address for the blockchain associated with the generate gateway API request. In some implementations, the blockchain service 111 generates an address for the blockchain associated with the gateway by using the public key of the keypair. In some implementations, the signing module 115 generates an address for the blockchain associated with the gateway by using the public key of the keypair, and provides the public key and the address to the blockchain service 111. In some variations, the blockchain service 111 creates the account gateway with the address (e.g., the generated public key or an address generated by using the public key) and associates the gateway with the account associated with the gateway generation API request.

In some variations, in a case of a memo gateway, generating an account gateway includes selecting a reusable receive address from a pool of addresses for an identified blockchain (e.g., a blockchain associated with a generate gateway API request), generating a unique memo string for an associated account (e.g., an account associated with the generate gateway API request), creating the account gateway with the combination of the selected address and the memo string, and associating the gateway with the account. In some implementations, the pool of addresses is managed by the blockchain service 111. In some variations, generating a memo gateway includes generating the gateway from an existing pool of addresses without generating a new keypair.

In some implementations, generating an account gateway includes generating a gateway identifier (ID) for the generated gateway. In some implementations, the blockchain service 111 generates the gateway ID. In some implementations, blockchain service returns a gateway ID and associated address (or combination of address and memo string) as a response to the generate gateway API request (e.g., a response provided to the user interface system 130).

S220 functions to monitor a blockchain to identify new blocks and transactions that are added to the blockchain.

In some variations, S220 includes monitoring blockchain transactions recorded by a blockchain network. In some variations, blockchain-specific interface sub-modules (included in the interface system 120) monitor blockchain transactions of associated blockchain networks. In some variations, S220 includes streaming blockchain data to an external system. In some implementations, the interface system 120 (or a component within the interface system) streams the blockchain data. In some implementations, the stream information includes at least one index of blockchain data for a blockchain network. In some variations, a data storage system receives the streamed blockchain data, and stores the received blockchain data.

S220 can include monitoring a plurality of blockchains. S220 can include monitoring a blockchain associated with at least one gateway generated at S210. In some variations, the blockchain service 111 uses the blockchain interface system 120 to monitor each blockchain. In some variations, the blockchain interface system 120 monitors each blockchain by using a respective blockchain interface (e.g., 121-123). In some implementations, the platform 101 is updated to provide interaction with a new blockchain by adding a respective blockchain interface sub-module to the blockchain interface system 120.

In some variations, each blockchain interface sub-module (e.g., 121-123) polls the respective blockchain for any new blocks. In some implementations, as new blocks are added to the blockchain, the blockchain interface sub-module extracts and parses the data of the block; the blockchain interface sub-module then stores the parsed data and orders it correctly and streams the data to the blockchain service 111. In some implementations, the blockchain interface sub-module streams the block data to a poller (e.g., 117a-c) of the blockchain service 111 that is associated with the blockchain. In some implementations, the blockchain service 111 is constructed to listen to the data stream of each blockchain (e.g., via a respective poller 117a-c).

In some variations, S220 includes determining whether any monitored blockchain transactions match an account gateway (e.g., the account gateway generated at S210) S221. In some variations, the blockchain service 111 determines whether any monitored blockchain transactions match an account gateway, based on information received via the interface system 120. In some implementations, the blockchain service module 111 matches addresses and memos in monitored blockchain transactions to the account gateways managed by the blockchain service module 111 (e.g., gateways generated at S210).

In some variations, a sub-module of the interface system 120 determines whether any monitored blockchain transactions match an account gateway. In some variations, the interface system 120 provides a notification to the blockchain service 111 in response to identifying a blockchain transaction matching an account gateway managed by the blockchain service 111.

In some variations, responsive to identifying a finalized blockchain transaction (receive transaction) that matches the account gateway (e.g., generated at S210), the blockchain service 111 marks the identified blockchain transaction as a payment (or deposit) and adds a corresponding ledger entry for the account and the destination of funds in a ledger data structure (e.g., stored in the database 113). In some implementations, the blockchain service 111 provides a payment notification to the user interface system 130 (S222). In some implementations, the payment notification includes a payment identifier. In some implementations, the blockchain service 111 provides the notification via at least one of a webhook and a queue service (e.g., Amazon Simple Queue Service, etc.). In some implementations, responsive to receiving the payment notification, the user interface system 130 provides a payment information request to the blockchain service 111 (e.g., via the API module 112); and in response to the payment information request, the blockchain service 111 processes the payment information request by providing payment information that includes at least one of: a sender identifier; a recipient identifier; an amount; and a status of the payment transaction (S223).

In some implementations, a receive event associated with the receive transaction is initially in a "pending" state meaning that the receive transaction has been seen on the blockchain but it has not been confirmed yet. In some implementations, at least one of the blockchain service 111 and the interface system 120 changes the state of the receive event to a "cancelled" state or a "confirmed" state, depending on the information that a corresponding interface sub-module (e.g., 121-123) observes from the blockchain network. In some implementations, the blockchain service 111 determines (or receives the state of the received event), and provides the state of the receive event (and state updates) to the user interface system 130 (e.g., via a webhook, queue system, pub-sub system, and the like) (S224). Once the receive event state of the receive transaction has been marked to "finalized", the asset (managed by the blockchain network) is available for use by a respective user of the platform 101. In some variations, a blockchain-specific sub-module (included in the interface system 120) determines whether the receive transaction has been finalized, in accordance with the protocol of the blockchain network, based on information received from the blockchain network by the interface sub-module. In some variations, the blockchain service 111 determines whether the receive transaction has been finalized, in accordance with the protocol of the blockchain network, based on information received from the blockchain network by a blockchain-specific sub-module (included in the interface system 120).

S230 functions to process at least one blockchain request (e.g., Send/Withdrawal request, or any other suitable blockchain request) to at least one blockchain. In some variations, the blockchain request is associated with a request type. In some implementations, request types (verbs) include at least one of: "withdrawal", "flush", "sweep", "restore", "custody", "maintenance", and "flex" (as shown in FIG. 3). In some implementations, request types (verbs) include a smart contract call request type to control a smart contract to perform a process implemented by the smart contract.

In some variations, the blockchain request identifies a blockchain network, and a verb (request type) supported by a protocol of the blockchain network.

In some variations, at least a portion of S230 is performed by at least one component of the platform 101.

In some variations, S230 includes at least one of: receiving a blockchain request (e.g., from the blockchain service 111, from the client interface system 199, from the user interface system 130, etc.); identifying a blockchain network associated with the blockchain request (e.g., by using at least one of the blockchain service 111, the operations module 114, the signing module 114, the interface system 120); the operations module 114 selecting, from among a plurality of sub-modules of the operations module, an operations sub-module that operates in accordance with a protocol of the identified blockchain network; the selected operations sub-module generating an unsigned transaction for the identified blockchain network, based on information identified by the blockchain request; signing the unsigned transaction with a private key associated with the blockchain request (e.g., by using the signing module 115); the interface system selecting, from among a plurality of sub-modules of the interface system, an interface sub-module (e.g., 121-123) that operates in accordance with the protocol of the identified blockchain network; the selected interface sub-module broadcasting the signed transaction via the identified blockchain network; and determining (e.g., by the blockchain service 111, a sub-module of the interface system 120, a blockchain-specific finality determination module, etc.) whether the signed transaction has been finalized, in accordance with the protocol of the blockchain network, based on information received from the blockchain network via the interface sub-module.

In some variations, the blockchain request identifies blockchain-specific parameters (e.g., a sequence value, etc.). In some variations, blockchain-specific parameters are determined during generation of the unsigned transaction, based on the blockchain request.

In some variations, S230 includes at least one of: the blockchain service in providing a blockchain transaction generation request to the operations module 114; the operations module 114 identifying a blockchain network associated with the transaction generation request; the operations module 114 selecting a blockchain-specific operations sub-module included in the operations module 114, based on the identified blockchain network; the operations sub-module generating an unsigned transaction for the identified blockchain (based on information identified by the transaction generation request), and providing the unsigned transaction to the blockchain service 111 as a response to the transaction generation request; the blockchain service 111 providing a blockchain transaction signing request to the signing module 115 (the transaction signing request including the unsigned transaction); the signing module 115 signing the unsigned transaction and providing the signed transaction to the blockchain service 111 as a response to the transaction signing request; the blockchain service 111 providing a blockchain transaction broadcast request to the interface system 120 (the broadcast request includes the signed transaction); the interface system 120 identifying the blockchain network based on the transaction broadcast request; the interface system selecting a blockchain-specific interface sub-module (e.g., 121-123) included in the interface system 120 based on the identified blockchain network; and the interface sub-module broadcasting the signed transaction via the blockchain network.

In some variations, the blockchain service 111 receives (from the interface sub-module) information about blocks recorded by the blockchain network, and determines whether the signed transaction has been finalized based on the information about blocks recorded by the blockchain network. In some variations, the blockchain service 111 determines whether the signed transaction has been finalized in accordance with a protocol for the blockchain network. In other variations, the interface system, a finality determination module, or any other suitable type of module can determine whether the signed transaction has been finalized, based on the information about blocks recorded by the blockchain network, and in accordance with a protocol for the blockchain network.

In some variations, the signing module 115 signs the unsigned transaction by accessing a private key associated with the unsigned transaction, and providing the private key and the unsigned transaction to a corresponding operations sub-module. The operations sub-module signs the unsigned transaction by using the private key, and provides the signed transaction to the signing module 115. The signing module 115 then provides the signed transaction, received from the operations sub-module, to the blockchain service 111.

S230 can include: receiving a blockchain transaction API request (via the API module 112) (e.g., from the user interface system 130) requesting that a blockchain transaction be sent by the platform 101 to at least one blockchain node (e.g., 102*a-c*). In some variations, the blockchain transaction API request specifies at least one of: a blockchain; blockchain transaction parameters; and an account gateway (e.g., an account gateway generated at S210). In some variations, the blockchain transaction API request is a Send request. In some variations, the blockchain transaction API request is a Withdrawal request.

Alternatively, S230 can include: the blockchain service 111 generating the blockchain request (e.g., a Sweep request in connection with a Sweep operation, a Flush request in connection with a Flush operation, etc.). In some implementations, a Sweep request is a request to transfer assets from a hot wallet (managed by the signing module 115) to cold storage (managed by the cold storage module 116). In some implementations, a Flush request is a request to transfer assets from cold storage (managed by the cold storage module 116) to a hot wallet (managed by the signing module 115).

S230 can include: the blockchain service 111 using at least one of the multi-chain operations module 114 and the signing module 115 to generate a signed blockchain transaction (in accordance with the blockchain request) for a specified blockchain, and the blockchain service 111 using the blockchain interface system 120 to broadcast (S234) the signed transaction to the specified blockchain by using a blockchain interface (e.g., 121-123) of the specified blockchain. In some variations, the blockchain service 111 generates the transaction by using a sub-module (of the operations module 114) that is constructed to interface with the specified blockchain (S232), and uses the signing module 115 to sign the transaction generated by the sub-module (S233). In a first variation, the operations module 114 determines chain-specific attributes for the generated transaction (S231), e.g., as described herein with respect to the operations module 114. In a second variation, another component (different from the operations module 114) determines the chain-specific attributes (S231). By virtue of including sub-modules (of the operations module 114) for a plurality of blockchains, and including interfaces (e.g., 121-123) for a plurality of blockchains, the blockchain system 101 functions to provide interaction with a plurality of blockchains.

S230 can include the blockchain service 111 sending a status update to the client interface system 199 (S235) once the signed transaction is broadcast to the associated blockchain network, once a request event is detected, or at any other suitable time. In some implementations, the update includes a transaction ID. S230 can optionally include the blockchain service 111 processing a transaction status request (e.g., API call) received from the user interface system 130 via the API module 112 (S236). In some implementations, the transaction status request includes the transaction ID sent by the blockchain service 111 to the user interface system 130. In some implementations, processing the transaction status request includes monitoring the blockchain associated with the transaction states request (by using a corresponding blockchain interface, e.g., 121-123), to identify a transaction on the blockchain that matches the broadcasted transaction (e.g., of S234), and responsive to identifying the transaction on the blockchain, setting a status of the transaction to "pending confirmation". In some implementations, the blockchain service 111 generates state information linking the matching blockchain request identified on the blockchain to the transaction (generated at S232).

S230 can include monitoring the blockchain of the transaction (generated at S232) (by using the corresponding blockchain interface, e.g., 121-123) to determine whether the transaction is finalized S237. In some variations, the protocol of the blockchain network or heuristics associated with the blockchain network defines finalization states for blockchain transactions. Finalization can be blockchain-dependent, be blockchain-agnostic, or be otherwise related to different blockchains. Examples of finalization include: probabilistic finality (e.g., less than a predetermined probability of the transaction being reverted), absolute finality (e.g., in PBFT-based protocols), economic finality (e.g., when the cost of reverting the block exceeds a predetermined cost, measured in fiat, computing resources, or another resource), or other finality types. In some implementations, a transaction is finalized if it has received at least a threshold number of confirmations. In some variations, the blockchain service 111 determines whether the transaction is finalized. In some variations, a blockchain-specific module sends the blockchain service 111 a notification indicating that the transaction is finalized. In some implementations, finalization of the transaction, the blockchain service 111 updates the ledger of the database 113 to include an entry for the transaction to the account generating the transaction (and optionally an account or address that is the source of the assets/funds transferred by the transaction). In some implementations, responsive to finalization of the transaction, the blockchain service 111 provides a transaction finalization notification for the transaction to the user interface system 130 via the API 112.

For Send blockchain requests, in some implementations processing the Send request includes: the blockchain service 111 creating an internal Withdraw request to represent the send request, and blockchain service 111 to determining if the account associated with the Send request has enough balance by comparing the balance field for the account in the ledger (of the blockchain service 111) with the send amount of the Send request and the send amounts of any in-flight Send requests. In some implementations, the blockchain service 111 selects an internal account and funding strategy that will act as the source of funds to satisfy the Send request ("coin selection"). Coin selection includes selecting a "from" address to satisfy the Send request. For a Send request, generating the transaction (S232) includes generating a transaction that includes the selected "from" address, a send destination identified by the Send request, and an amount identified by Send request. In some variations, the signing module 115 performs S232, whereas in other variations the operations module 114 performs S232. For a Send request, signing the transaction (S233) includes: the signing module 115 using the "from" address identified in the transaction to retrieve a private key, the signing module 115 decrypting the private key, signing the transaction with the decrypted private key, and providing the signed transaction to the blockchain service 111. Upon receiving the signed transaction from the signing module 115, the blockchain service 111 sends a broadcast request to the blockchain interface system 120. In some implementations, the blockchain interface system 120 selects a blockchain interface (e.g., 121-123) and forwards the broadcast request to the selected blockchain interface. In some implementations, the blockchain service 111 selects a blockchain interface (e.g., 121-123) and sends the broadcast request to the selected blockchain interface. In some implementations, the selected blockchain interface broadcasts the transaction to a blockchain node (e.g., 102*a-c*) that is associated with the blockchain protocol of the transaction.

In some variations, processing a blockchain request includes: processing the blockchain request in accordance with a request type of the blockchain request. In some variations, the blockchain service 111 selects a transaction plan based on the request type of the blockchain request and an accounting model of the currency associated with the blockchain request, and processes the blockchain request in accordance with the transaction plan. In some implementations, an account identified in the blockchain request is associated with a currency, and the transaction plan is selected (at least in part) based on this currency. In some variations, a transaction plan describes a strategy for processing a blockchain request having a request type that corresponds to the transaction plan. In some implementations, transaction plans include at least one of: "simple", "UTXO", and "Opaque". A Simple transaction plan is a transaction plan for account-based blockchain transactions with one "from" and one "to" address. A UTXO transaction plan is a transaction plan for a transaction with multiple "from" and "to" addresses. An Opaque transaction plan is a transaction plan for a transaction originating from a single address that performs an action that is not a "send" transition (e.g., a transaction with an arbitrary unsigned payload that does not result in a value transfer).

In some implementations, each transaction plan defines at least one of the following processes: "create and lock"; "generate"; "sign"; "broadcast"; "lock"; and "unlock". In some implementations, each transaction plan identifies machine-executable instructions for each process defined by the transaction. When executed by a processor, the instructions of a transaction plan process control the processor to perform the corresponding process. The "create and lock" process functions to generate a transaction plan and atomically lock at least one input address. In some implementations, if a lock cannot be acquired, an associated request becomes paused. The "generate" transaction plan serializes the strategy to a set of from/to addresses using the operations module 114. The "sign" transaction plan functions to sign an unsigned transaction by using the signing module 115. The "broadcast" transaction plan functions to broadcast the signed transaction by using the blockchain interface system 120. The "lock" transaction plan functions to lock at least one input address. The "unlock" transaction plan functions to unlock at least one input address.

In some variations, each blockchain network uses exactly one accounting model, which determines how funds (assets) are managed between accounts and their associated gateways. In some implementations, accounting models include at least one of: a "Unique Deposit Address" model; a "Memo To Pool" model; and a "UTXO" model.

In blockchain networks using the "Unique Deposit Address" accounting model, incoming funds are received via address-only Gateways linked to external Accounts. Funds are flushed internally between different hot wallet Accounts (e.g., from an inbound hot wallet to an outbound hot wallet), from which they are sent off-platform (e.g., to an address not managed by the platform 101) by processing a Send request using a Simple transaction plan. In an example, the XTZ (Tezos) blockchain network uses a "Unique Deposit Address" accounting model.

In blockchain networks using the "Memo To Pool" accounting model, incoming funds are received via address+memo Gateways linked to external Accounts. Funds are never flushed internally. Funds are sent off-platform (in a Send request) (e.g., to an address not managed by the system 101) by locking the sending hot wallet address by processing the Send request using a Simple transaction plan. In an example, the XLM (Stellar), XRP (Ripple), and EOS (EOS) blockchain networks use a "Memo To Pool" accounting model.

In blockchain networks using the "UTXO" accounting model, incoming funds are received via addresses linked to external Accounts. Funds are flushed internally from one or more inbound hot wallet Accounts to one or more outbound hot wallet Accounts. Funds are sent off-platform (in a Send request) (e.g., to an address not managed by the platform 101) by locking the sending hot wallet address by processing the Send request using a UTXO transaction plan. In an example, the BTC (Bitcoin) blockchain network uses a "UTXO" accounting model.

In some variations, accounts are entities on behalf of which the platform 101 manages funds. The platform 101 represents accounts as data structures that store information identifying a UUID, a currency, and a network. In some implementations, an account data structure stores information identifying an account type; and account types identify a requestor (e.g., the user interface 130, a sub-module of the user interface 130, etc.) that provides an API request to the API module 112 to generate the account. As disclosed herein, gateways link an address to an account. Gateways are used exclusively for associating deposits to an appropriate account. Each gateway managed by the platform 101 is represented as a data structure that stores information identifying a blockchain network, an address, an account, a currency (and optionally a memo). In some implementations, accounts can have many gateways. In some implementations, the platform 101 uses gateways to identify incoming funds to an account, and is always associated with one account. For some currencies, the gateway is a unique address generated for that account. For others, it is both a fund pool address along with a unique memo generated for the account. In some implementations, when the blockchain service 111 sees a transaction operation, it checks to see if any of the gateways match; if it finds a match, it looks up the account associated with the matching gateway and creates a Deposit operation.

S230 can include processing a blockchain request to send funds to an external address (S230*c* shown in FIG. 6), which can include: receiving via the API 112 a Withdraw request that identifies an account of a user of the system 101, a quantity of funds, and a recipient Address. In some implementations, the Withdraw request identifies at least one option (e.g., a memo, gas limit, etc.). The blockchain service 111 processes the Withdraw request by generating a Gateway that can fulfill the request (based on the information identified in the Withdraw request), a currency associated with the user account, and a state of hot wallet accounts of the currency (managed by the signing module 115). The blockchain service 111 generates a transaction plan according to the accounting model of the currency, and locks the input hot wallet addresses of the transaction plan. The blockchain service 111 generates and signs a transaction according to the serialized transaction plan (by using at least one of the operations module 114 and the signing module 115) and stores the signed transaction. The blockchain service 111 then broadcasts the signed transaction by using an interface (e.g., 121-123) that matches the currency. The poller for the currency (e.g., 117*a-c*) processes an incoming block (received via the interface for the currency, e.g., 121-123) and looks up the transaction hash of all transactions against the transaction hashes in a table managed by the blockchain service 111 that associates transaction hashes with withdraw requests. Upon identifying a matching withdraw request, the poller generates a Withdraw operation object (data structure) with the transaction details and associates the Withdraw operation object with the Withdraw request. The blockchain service 111 then unlocks the locked hot wallets identified in the transaction plan.

S220 can include receiving funds from an external address to a memo gateway, which can include: a poller (e.g., 117*a-c*) processing an incoming block (received via the interface for the currency, e.g., 121-123) and identifying that a transaction address/memo matches a Gateway managed by the blockchain service 111. The poller generates a Deposit operation object and associates the Deposit operation object with the account of the gateway and a transaction hash of the matching transaction (identified in the incoming block).

Figure 6:
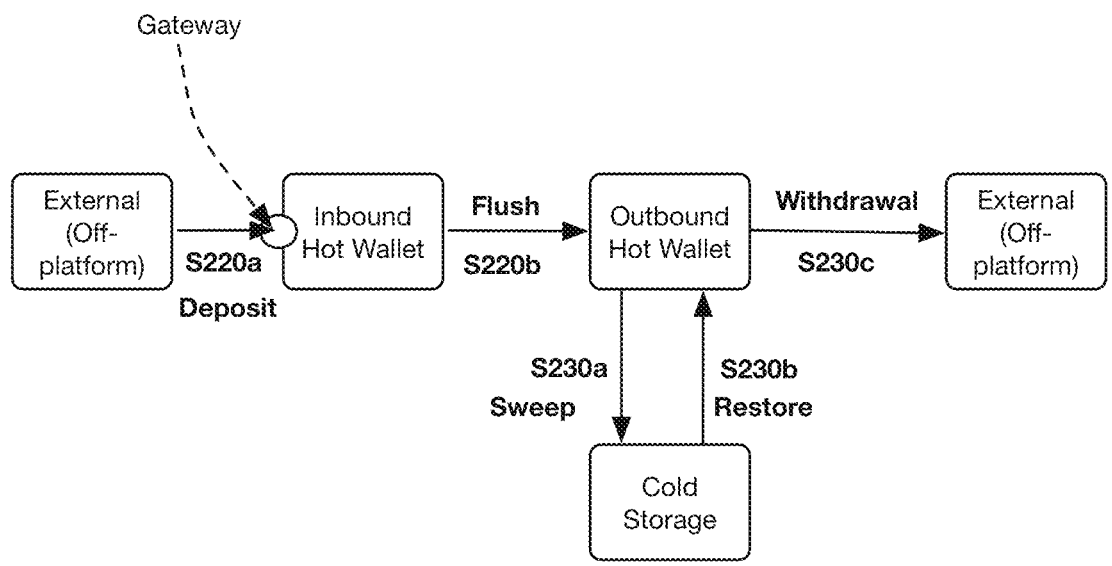
FIG. 6 is a flowchart representation of operations, in accordance with embodiments.

S220 can include receiving funds from an external address to an address-only gateway (e.g., S220*a* as shown in FIG. 6), which can include: a poller (e.g., 117*a-c*) processing an incoming block (received via the interface for the currency, e.g., 121-123) and identifying that a transaction "To" address/memo matches a hot wallet address gateway (e.g., a gateway for an inbound hot wallet) managed by the blockchain service 111. The poller generates a Deposit operation object and associates the Deposit operation object with the account of the gateway and a transaction hash of the matching transaction (identified in the incoming block). The Poller applies the Deposit operation to the ledger managed by the blockchain service 111 resulting in the appropriate debits and credits. In some implementations, the Poller initiates a Flush request from the Inbound hot wallet of the Gateway to an Outbound Hot Wallet (S220*b*). The blockchain service 111 processes the Flush request by using a Simple transaction plan, which can fulfill the request, which locks the hot wallet address gateway (of the Inbound Hot Wallet).

The blockchain service 111 then generates and signs a transaction according to the serialized transaction plan (by using at least one of the operations module 114 and the signing module 115) and stores the signed transaction. The blockchain service generates and signs the transaction by using currency-specific modules (e.g., included in at least one of the operations module 114 and the signing module 115). The blockchain service 111 then broadcasts the signed transaction by using an interface (e.g., 121-123) that matches the currency. The poller for the currency (e.g., 117*a-c*) processes an incoming block (received via the interface for the currency, e.g., 121-123) and looks up the transaction hash of all transactions against the transaction hashes in a table managed by the blockchain service 111 that associates transaction hashes with Flush requests. Upon identifying a matching Flush request, the poller generates a Flush operation object (data structure) with the transaction details and associates the Flush operation object with the Flush request. The blockchain service 111 then unlocks the locked Inbound hot wallet addresses of the Gateway.

S230 can include processing a blockchain request to sweep funds from an outbound hot wallet (of a given currency) to a cold storage, which includes: the signing module 115 initiating a Sweep request from an outbound hot wallet address to a cold storage account (managed by the cold storage module 116) (S230*a*). The blockchain service 111 processes the Sweep request by using a Simple transaction plan, which can fulfill the request, which locks the outbound hot wallet Address. The blockchain service 111 then generates and signs a transaction according to the serialized transaction plan (by using at least one of the operations module 114 and the signing module 115) and stores the signed transaction. The blockchain service 111 generates and signs the transaction by using currency-specific modules (e.g., included in at least one of the operations module 114 and the signing module 115). The blockchain service 111 then broadcasts the signed transaction by using an interface (e.g., 121-123) that matches the currency. The poller for the currency (e.g., 117*a-c*) processes an incoming block (received via the interface for the currency, e.g., 121-123) and looks up the transaction hash of all transactions against the transaction hashes in a table managed by the blockchain service 111 that associates transaction hashes with Sweep requests. Upon identifying a matching Sweep request, the poller generates a Sweep operation object (data structure) with the transaction details and associates the Sweep operation object with the Sweep request. The blockchain service 111 then unlocks the locked outbound hot wallet addresses.

S230 can include processing a blockchain request to restore funds from cold storage to a hot wallet address, which includes: the signing module 115 initiating a Restore request from a cold storage address to an outbound hot wallet address (managed by the cold storage module 116) (S230*b*). The request identifies the cold storage address as a source of funds, a quantity, and a target outbound hot wallet address. The request can also identify at least one option (e.g., memo, gas limit). The blockchain service 111 uses the source, target, currency (associated with the cold storage address), quantity, and state of the outbound hot wallet accounts in that currency to generate a cold storage transaction plan which can fulfill the request.

The blockchain service 111 processes the Restore request by using the cold storage transaction plan, which locks the cold storage address. The blockchain service in then generates and signs a transaction according to the serialized transaction plan (by using at least one of the operations module 114 and the cold storage module 116) and stores the signed transaction. The blockchain service 111 generates and signs the transaction by using currency-specific modules (e.g., included in at least one of the operations module 114 and the cold storage module 116). The blockchain service 111 then broadcasts the signed transaction by using an interface (e.g., 121-123) that matches the currency. The poller for the currency (e.g., 117*a-c*) processes an incoming block (received via the interface for the currency, e.g., 121-123) and looks up the transaction hash of all transactions against the transaction hashes in a table managed by the blockchain service 111 that associates transaction hashes with Restore requests. Upon identifying a matching Restore request, the poller generates a Restore operation object (data structure) with the transaction details and associates the Restore operation object with the Restore request. The blockchain service 111 then unlocks the locked cold storage addresses.

In an example, the method can include: receiving a request with a blockchain identifier from a client (e.g., an authorized client); determining a set of actions associated with the request (e.g., a series of generic or chain-specific actions, determined based on the blockchain identifier, associated with the request); and executing each action (e.g., in series). Executing the actions can include: constructing a transaction for the blockchain, including retrieving blockchain-specific attributes (e.g., based on the blockchain identifier, from a chain-specific attribute database) and constructing the transaction based on the retrieved attributes and the request values; transmitting the transaction to the identified blockchain (e.g., via a node for the blockchain hosted by the platform); monitoring the identified blockchain for a predetermined set of blockchain events (e.g., confirmations, block number, etc.); performing the next action in the action series based on the detected blockchain event; sending a response to the client based on the detected blockchain event; generating a blockchain address (e.g., for unique transaction identification); and/or any other suitable action.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method of facilitating concurrency control for a blockchain platform with respect to a limited number of blockchain addresses despite a greater number of user accounts generating blockchain requests, the method comprising:
    generating, by a server system of the blockchain platform, (i) multiple first auxiliary identifiers associated with an account of a first user using blockchain addresses associated with a blockchain and (ii) multiple second auxiliary identifiers associated with an account of a second user different from the first user using at least some of the blockchain addresses,
        each identifier of the first auxiliary identifiers being an off-chain address generated using a given blockchain address different from addresses of the blockchain addresses used to generate other identifiers of the first auxiliary identifiers;
    in response to receiving a blockchain request indicating a first account of the first user associated with a first auxiliary identifier of the first auxiliary identifiers, performing, by the server system, a lock operation on a blockchain address used to generate the first auxiliary identifier;
    selecting, by the server system, from among a plurality of sub-modules associated with different blockchains, an operations sub-module for the blockchain request that operates in accordance with a protocol of the blockchain;
    generating, by the server system, via the selected operations sub-module, a transaction for the blockchain using information in the blockchain request;
    selecting, by the server system, from among a plurality of sub-modules associated with the different blockchains, an interface sub-module for the transaction that operates in accordance with the protocol of the blockchain;
    while the blockchain address remains locked from the lock operation, broadcasting, by the server system, the transaction to the blockchain; and
    in response to determining that a transaction hash of the transaction is stored on the blockchain in connection with the broadcast of the transaction, performing, by the server system, an unlock operation on the blockchain address used to generate the first auxiliary identifier.

2. The method of claim 1, further comprising:
    streaming, by the server system, block data of one or more blocks of the blockchain to a poller associated with the blockchain, the poller being one of a plurality of pollers of the blockchain platform;
    identifying, by the poller, the transaction hash as being in both the block data and in an off-chain database of the blockchain platform by processing the block data to identify the transaction hash in the block data and querying the off-chain database for a corresponding instance of the transaction hash identified in the block data; and
    determining that the transaction is recorded on the blockchain based on the identification of the poller.

3. The method of claim 1, further comprising:
    in response to receiving an identifier creation API request for a new auxiliary identifier, selecting, by the server system, the blockchain address from a set of blockchain addresses and generating the first auxiliary identifier using the blockchain address; and
    generating, by the server system, a response to the identifier creation API request, the response comprising the first auxiliary identifier.

4. A computer system of a blockchain platform, the computer system comprising:
    one or more processors programmed with computer program instructions that, when executed by the one or more processors, cause operations comprising:
        generating (i) first auxiliary identifiers associated with an account of a first user using blockchain addresses and (ii) second auxiliary identifiers associated with an account of a second user different from the first user using at least some of the blockchain addresses,
            at least one identifier of the first auxiliary identifiers being generated using a given blockchain address different from addresses of the blockchain addresses used to generate other identifiers of the first auxiliary identifiers;
        in response to receiving a blockchain request indicating a first account associated with a first auxiliary identifier of the first auxiliary identifiers, performing a lock operation on a blockchain address used to generate the first auxiliary identifier;
        selecting, from among a plurality of sub-modules associated with different blockchains, an operations sub-module for the blockchain request that operates in accordance with a protocol of a blockchain;
        generating, via the selected operations sub-module, a transaction for the blockchain using information in the blockchain request;
        while the blockchain address remains locked from the lock operation, broadcasting the transaction to the blockchain; and
        in response to determining that the transaction has been recorded on the blockchain, performing an unlock operation on the blockchain address used to generate the first auxiliary identifier.

5. The computer system of claim 4, wherein performing the unlock operation on the blockchain address comprises, in response to determining that a transaction hash of the transaction is stored on the blockchain after the broadcast of the transaction, performing the unlock operation on the blockchain address used to generate the first auxiliary identifier.

6. The computer system of claim 5, the operations further comprising:
   obtaining block data of one or more blocks of the blockchain;
   identifying the transaction hash as being in both the block data and in an off-chain database of the blockchain platform by processing the block data to identify the transaction hash in the block data and querying the off-chain database for a corresponding instance of the transaction hash identified in the block data; and
   determining that the transaction is recorded on the blockchain based on the identification of the transaction hash as being in both the block data and in an off-chain database of the blockchain platform.

7. The computer system of claim 4, the operations further comprising:
   in response to receiving an identifier creation API request for a new auxiliary identifier, selecting the blockchain address from a set of blockchain addresses and generating the first auxiliary identifier using the blockchain address; and
   generating a response to the identifier creation API request, the response comprising the first auxiliary identifier.

8. The computer system of claim 4, wherein the first auxiliary identifier is an address generated from (i) the blockchain address and (ii) a unique string for the first account.

9. The computer system of claim 4, wherein the blockchain request indicates an action supported by a protocol of the blockchain, and wherein generating the transaction comprises generating a given transaction for the action indicated in the blockchain request.

10. The computer system of claim 9, wherein the action comprises sending an amount of cryptocurrency from a source to a destination.

11. The computer system of claim 9, wherein the action comprises delegating an amount of cryptocurrency for a proof-of-stake blockchain, transferring funds from an inbound hot wallet to an outbound hot wallet, transferring funds from an outbound hot wallet to cold storage, transferring funds from cold storage to an outbound hot wallet, performing staking, or invoking a smart contract process.

12. One or more non-transitory computer-readable media storing computer program instructions that, when executed by one or more processors of a blockchain platform, perform operations comprising:
   generating (i) first auxiliary identifiers associated with an account of a first user using blockchain addresses and (ii) second auxiliary identifiers associated with an account of a second user different from the first user using at least some of the blockchain addresses,
   at least one identifier of the first auxiliary identifiers being generated using a given blockchain address different from addresses of the blockchain addresses used to generate other identifiers of the first auxiliary identifiers;
   in response to receiving a blockchain request indicating a first account associated with a first auxiliary identifier of the first auxiliary identifiers, performing a lock operation on a blockchain address used to generate the first auxiliary identifier;
   selecting, from among a plurality of sub-modules associated with different blockchains, an operations sub-module for the blockchain request that operates in accordance with a protocol of a blockchain;
   generating, via the selected operations sub-module, a transaction for the blockchain using information in the blockchain request;
   while the blockchain address remains locked from the lock operation, broadcasting the transaction to the blockchain; and
   in response to determining that the transaction has been recorded on the blockchain, performing an unlock operation on the blockchain address used to generate the first auxiliary identifier.

13. The media of claim 12, wherein performing the unlock operation on the blockchain address comprises, in response to determining that a transaction hash of the transaction is stored on the blockchain after the broadcast of the transaction, performing the unlock operation on the blockchain address used to generate the first auxiliary identifier.

14. The media of claim 13, the operations further comprising:
   obtaining block data of one or more blocks of the blockchain;
   identifying the transaction hash as being in both the block data and in an off-chain database of the blockchain platform by processing the block data to identify the transaction hash in the block data and querying the off-chain database for a corresponding instance of the transaction hash identified in the block data; and
   determining that the transaction is recorded on the blockchain based on the identification of the transaction hash as being in both the block data and in an off-chain database of the blockchain platform.

15. The media of claim 12, the operations further comprising:
   in response to receiving an identifier creation API request for a new auxiliary identifier, selecting the blockchain address from a set of blockchain addresses and generating the first auxiliary identifier using the blockchain address; and
   generating a response to the identifier creation API request, the response comprising the first auxiliary identifier.

16. The media of claim 12, wherein the first auxiliary identifier is an address generated from (i) the blockchain address and (ii) a unique string for the first account.

17. The media of claim 12, wherein the blockchain request indicates an action supported by a protocol of the blockchain, and wherein generating the transaction comprises generating a given transaction for the action indicated in the blockchain request.

18. The media of claim 17, wherein the action comprises sending an amount of cryptocurrency from a source to a destination.

19. The media of claim 17, wherein the action comprises delegating an amount of cryptocurrency for a proof-of-stake blockchain, performing staking, or invoking a smart contract process.

20. The media of claim 17, wherein the action comprises transferring funds from an inbound hot wallet to an outbound hot wallet, transferring funds from an outbound hot wallet to cold storage, or transferring funds from cold storage to an outbound hot wallet.

* * * * *